(12) United States Patent
Ahmed et al.

(10) Patent No.: US 11,871,402 B2
(45) Date of Patent: Jan. 9, 2024

(54) METHOD AND APPARATUS FOR LONG TERM EVOLUTION OPERATION IN UNLICENSED AND SHARED SPECTRUM FOR CLOUD RADIO ACCESS NETWORKS

(71) Applicant: MAVENIR NETWORKS, INC., Richardson, TX (US)

(72) Inventors: Wessam Afifi Ahmed, Plano, TX (US); Sridhar Rajagopal, Plano, TX (US); Ajay Nigam, Bengaluru (IN); Hersh Vardhan Shukla, Bengaluru (IN); Tarak Taranekar, Bangalore (IN); Ajit Ashok Joshi, Bangalore (IN)

(73) Assignee: Mavenir Networks, Inc., Richardson, TX (US)

( * ) Notice: Subject to any disclaimer, the term of this patent is extended or adjusted under 35 U.S.C. 154(b) by 23 days.

(21) Appl. No.: 17/409,441

(22) Filed: Aug. 23, 2021

(65) Prior Publication Data
US 2021/0392657 A1 Dec. 16, 2021

Related U.S. Application Data

(62) Division of application No. 16/272,255, filed on Feb. 11, 2019, now Pat. No. 11,212,818.

(60) Provisional application No. 62/668,012, filed on May 7, 2018, provisional application No. 62/659,546, filed on Apr. 18, 2018, provisional application No. 62/628,538, filed on Feb. 9, 2018.

(51) Int. Cl.
*H04W 16/14* (2009.01)
*H04W 28/02* (2009.01)
*H04W 72/12* (2023.01)
*H04W 74/08* (2009.01)

(52) U.S. Cl.
CPC ....... *H04W 72/1215* (2013.01); *H04W 16/14* (2013.01); *H04W 28/0236* (2013.01); *H04W 28/0268* (2013.01); *H04W 28/0278* (2013.01); *H04W 74/0816* (2013.01)

(58) Field of Classification Search
None
See application file for complete search history.

(56) References Cited

U.S. PATENT DOCUMENTS

| | | | |
|---|---|---|---|
| 2017/0086172 A1* | 3/2017 | Dinan | H04L 5/0048 |
| 2017/0099678 A1* | 4/2017 | Dinan | H04W 74/0808 |
| 2017/0111888 A1* | 4/2017 | Dinan | H04L 5/0053 |
| 2017/0325115 A1 | 11/2017 | Matsumoto et al. | |
| 2018/0020479 A1* | 1/2018 | Harada | H04W 74/006 |
| 2018/0027590 A1 | 1/2018 | Yerramalli et al. | |
| 2018/0069653 A1 | 3/2018 | Fujishiro et al. | |
| 2018/0270679 A1 | 9/2018 | Laselva et al. | |
| 2018/0343577 A1 | 11/2018 | Takiguchi et al. | |

(Continued)

OTHER PUBLICATIONS

Third Generation Partnership Project (3GPP) technology standards [TS 36.133 v14.6.0] Evolved Universal Terrestrial Radio Access (E-UTRA); Requirements for Support of Radio Resource Management (Release 14). Dec. 2017.

(Continued)

*Primary Examiner* — Sai Aung
(74) *Attorney, Agent, or Firm* — Ruggiero, McAllister & McMahon LLC

(57) ABSTRACT

There is provided a system, method, and interfaces for Radio Access Networks and Cloud Radio Access Networks.

10 Claims, 24 Drawing Sheets

(56) References Cited

U.S. PATENT DOCUMENTS

| | | | |
|---|---|---|---|
| 2019/0014594 A1* | 1/2019 | Park | H04W 74/0808 |
| 2019/0044639 A1 | 2/2019 | Ouchi et al. | |
| 2019/0058515 A1* | 2/2019 | Harada | H04B 7/0626 |
| 2019/0182691 A1* | 6/2019 | Wang | H04L 5/0048 |
| 2019/0223216 A1* | 7/2019 | Siomina | H04W 74/0808 |
| 2019/0296790 A1 | 9/2019 | Ye et al. | |
| 2019/0364469 A1* | 11/2019 | Siomina | H04W 36/30 |
| 2020/0245355 A1 | 7/2020 | Mueck et al. | |

OTHER PUBLICATIONS

Third Generation Partnership Project (3GPP) technology standards [TS 36.211 v14.3.0] Evolved Universal Terrestrial Radio Access (E-UTRA); Physical Channels and Modulation (Release 14). Jun. 2017.

Third Generation Partnership Project (3GPP) technology standards [TS 36.213 v15.1.0] Evolved Universal Terrestrial Radio Access (E-UTRA); Physical Layer Procedures (Release 15). Mar. 2018.

Third Generation Partnership Project (3GPP) technology standards [TS 36.300 v15.1.0] Evolved Universal Terrestrial Radio Access (E-UTRA) and Evolved Universal Terrestrial Radio Access Network (E-UTRAN); Overall Description; Stage 2 (Release 15). Mar. 2018.

Third Generation Partnership Project (3GPP) technology standards [TS 36.104 v15.2.0] Evolved Universal Terrestrial Radio Access (E-UTRA); Base Station (BS) radio transmission and reception (Release 15). Mar. 2018.

Third Generation Partnership Project (3GPP) technical reports [TR 36.889 v13.0.0] Study on Licensed-Assisted to Unlimited Spectrum(Release 13). Jun. 2015.

Third Generation Partnership Project (3GPP) technical reports [TR 38.801 v14.0.0] Study on New Radio Access Technology: Radio Access Architecture and Interfaces (Release 14). Mar. 2017.

XRAN Fronthaul Working Group (XRAN-FH.CUS.0-v01.00) Control, User and Synchronization Plane Specification. Apr. 4, 2018.

* cited by examiner

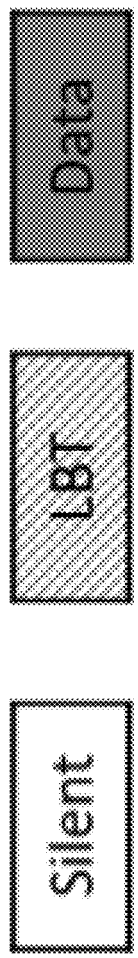
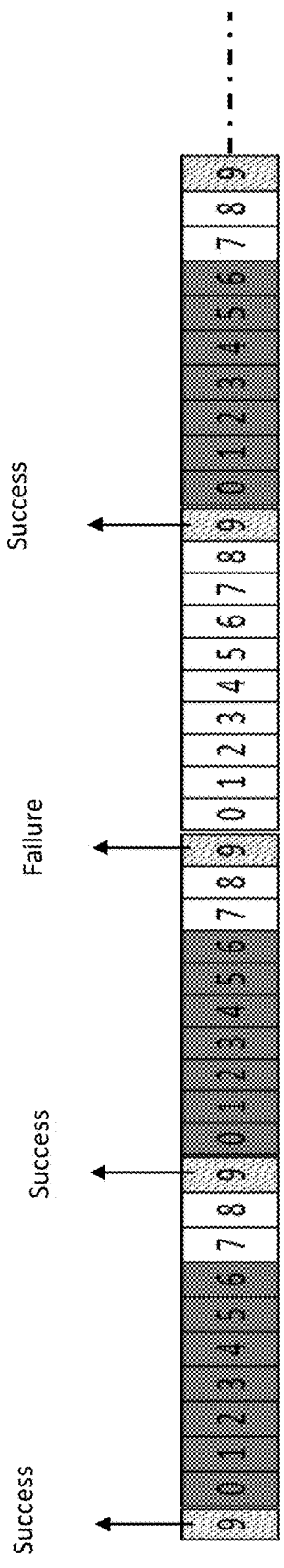
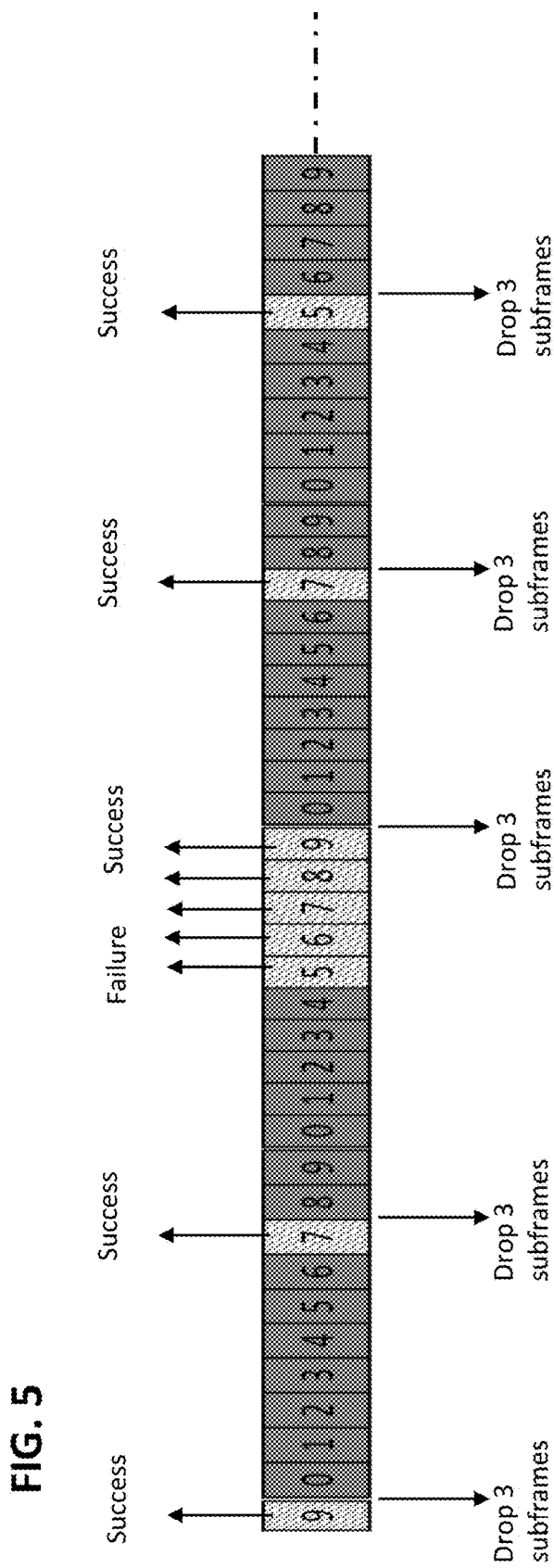
FIG. 4
FIG. 5
FIG. 6

PDSCH Transmission Algorithm
lls-CU flowchart

PDSCH Transmission Algorithm
RU flowchart

PDSCH Transmission Algorithm 316
RU flowchart

Case 1: LBT < 1 subframe

Case 2: LBT > 1 subframe

Case 3: LBT < 1 slot

Case 2: LBT > 1 subframe (Method 2)

Case 5: DRS – 25 us LBT

Case 6: DRS – LBT CAT 4

METHOD AND APPARATUS FOR LONG TERM EVOLUTION OPERATION IN UNLICENSED AND SHARED SPECTRUM FOR CLOUD RADIO ACCESS NETWORKS

CROSS REFERENCE TO RELATED APPLICATIONS

The present application claims priority to U.S. Provisional Patent Application No. 62/628,538, entitled METHOD AND APPARATUS FOR LTE OPERATION IN UNLICENSED AND SHARED SPECTRUM FOR CLOUD RADIO ACCESS NETWORKS, filed on Feb. 9, 2018 the entirety of which is incorporated herein by reference.

The present application also claims priority to U.S. Provisional Patent Application No. 62/659,546, entitled METHOD AND APPARATUS FOR LTE OPERATION IN UNLICENSED AND SHARED SPECTRUM FOR CLOUD RADIO ACCESS NETWORKS, filed on Apr. 18, 2018, the entirety of which is incorporated herein by reference.

The present application also claims priority to U.S. Provisional Patent Application No. 62/668,012, entitled METHOD AND APPARATUS FOR LICENSED-ASSISTED ACCESS (LAA) FOR CLOUD RAN AND FOR MULTI-LAA CELLS, filed on May 7, 2018, the entirety of which is incorporated herein by reference.

The present application claims priority to U.S. patent application Ser. No. 16/272,255, entitled METHOD AND APPARATUS FOR LTE OPERATION IN UNLICENSED AND SHARED SPECTRUM FOR CLOUD RADIO ACCESS NETWORKS, filed on Feb. 11, 2019 the entirety of each of which is incorporated herein by reference.

BACKGROUND OF THE DISCLOSURE

1. Field of the Disclosure

The present disclosure relates to systems and methods for radio access networks.

2. Description of the Related Art

Conventional the radio access networks (RAN) were built employing an integrated unit where the entire RAN was processed. The RAN network traditionally uses application specific hardware for processing, making them difficult to upgrade and evolve. As future networks evolve to have massive densification of networks to support increased capacity requirements, there is a growing need to reduce the capital and operating costs of RAN deployment and make the solution scalable and easy to upgrade.

Cloud based Radio Access Networks (C-RAN) are networks where a significant portion of the RAN layer processing is performed at a central unit (CU), also known as the baseband unit (BBU), located in the cloud on commercial off the shelf servers while the RF and real-time critical functions can be processed in the remote radio unit (RRU) or distributed unit (DU).

Traditional RANs implement the protocol stack (e.g., Physical Layer (PHY), Medium Access Control (MAC), Radio Link Control (RLC), Packet Data Convergence Control (PDCP layers)) at the base-station (also referred to as the eNodeB or eNB). In Cloud RAN, different radio functions are split between the RRU and the baseband unit BBU. RRUs are implemented locally onsite, while the BBU is virtualized on the cloud, which could be hundreds of miles away from the RRU. A single BBU (or vRAN) can control multiples of RRUs in different locations.

Cloud RAN provides centralization and virtualization of RAN networks, leading to benefits such as (a) operation cost reduction due to resource pooling and running the network on general-purpose hardware, enabling economies of scale, (b) performance improvements due to better interference management, (c) remote upgradeability and management of the network, and (d) simpler migration to add new features and transition from 4G to 5G networks.

In conventional long-term evolution (LTE) operation in licensed bands, mobile network operators have exclusive right to use the spectrum. Hence, they have full control over scheduling, resource allocation, and spectrum access. As new wireless technologies evolve, and since wireless demand has increased exponentially in the last decade, there has been an interest in the last few years in extending LTE technologies to operate in unlicensed and shared spectrum. This happened especially after the FCC has opened new bands for unlicensed/shared operation in the 5 GHz UNII bands and other bands.

SUMMARY OF THE DISCLOSURE

The present disclosure provides embodiments of a system, method, and devices for LTE operation in the unlicensed bands, where a BBU is configured to schedule non-Guaranteed Bit Rate (non-GBR) traffic on unlicensed cells and Guaranteed Bit Rate (GBR) traffic on licensed cells. The BBU is also configured to schedule priority classes 3 and 4 on unlicensed cells, while priority classes 1 and 2 are scheduled on licensed cells.

The present disclosure also provides embodiments of a system and method for LTE operation in the unlicensed bands in the cloud RAN framework, where a BBU, at the Radio Link Control (RLC) layer, is configured to retransmit failed packets originally transmitted on the unlicensed band on a licensed band.

The present disclosure further provides embodiments of a system and method wherein a BBU is configured to set a timer, based on an end-to-end latency requirement of the traffic, and tries transmission on an unlicensed band. Once the timer expires, the BBU can be configured to retransmit the failed packets on licensed bands. The timer threshold can be set based on the expected duration a packet needs to be received at the UE including the expected fronthaul latency, expected Listen Before Talk (LBT) latency, and other parameters.

The present disclosure still further provides a system and method for LTE operation in the unlicensed bands in which a dynamic frequency selection (DFS) process is triggered by an LBT failure.

In an embodiment, the present disclosure provides a method, and system and devices therefor, comprising:

transmitting, from a lower layer a Baseband Unit (BBU) to a layer of a Remote Radio Unit (RRU), via a fronthaul interface, a data transmission at a target subframe agreed on between the BBU and the RRU, wherein the data is sent is a number of microseconds before the RRU performs a Listen Before Talk (LBT) operation for the data, wherein a Control Unit (CU) of the BBU is configured to set a timer, based on an end-to-end latency requirement of data traffic, and is configured to attempt transmission on an unlicensed band.

In the embodiment, the CU can be further configured to:
transmit, from the CU, an RRU buffer depth ($B_{RU}$) amount of the data a CU transmission time threshold at which the CU is required to transmit the data to the RRU to be transmitted over the air (OTA) at $T_{start}$ ($CUT_{th}$);

for the target subframe, transmit an LBT physical downlink shared channel (PDSCH) request to the RRU;

determine if an LBT PDSCH response is received from the RRU at the CU;

determine if the LBT PDSCH response is successful; and if the LBT PDSCH response is successful, increment a CU transmission start time ($T_{start}$) by a buffer depth of the RRU ($T_{start}=T_{start} B_{RU}$), or reset the LBT operation if the received LBT PDSCH response is not successful.

In the embodiment, the CU can be further configured to:

increment the CU transmission start time ($T_{start}$) by the buffer depth of the RRU ($T_{start}=T_{start} B_{RU}$) when the LBT PDSCH response from the RRU is determined to be successful;

determine if the remaining data is less than the buffer depth of the RRU ($B_{RU}$); and if so, transmit the remaining data to the RRU at the CU transmission time threshold $CUT_{th}$, or if not, transmit only the $B_{RU}$ amount of data to the RRU. When the CU determines that the LBT PDSCH response is not received from the RRU at the CU, the CU is further configured to:

determine if a current time is a latest time the CU is expected to receive the LBT PDSCH response from the RRU ($T_{Now}=LBT_{TH}$);

if so, update the time when the data is supposed to be transmitted OTA (OTA $T_{start}=T_{start} \lceil B_{RU} \rceil$); and continue to determine if the LBT PDSCH response is not received from the RRU at the CU. If the CU determines the current time is not the latest time the CU is expected to receive the LBT PDSCH response from the RRU ($T_{Now}=LBT_{TH}$), the CU can be further configured to: determine if the current time is equal to the CU transmission time threshold $CUT_{th}$, and: if so, transmit $B_{RU}$ worth of data; or if not, return to determining if the LBT PDSCH response has been received.

In the embodiment, the RRU can be configured to:

determine if an LBT physical downlink shared channel (PDSCH) request is transmitted by the CU;

start an LBT spectrum sensing if the LBT PDSCH request is received from the CU;

determine if an LBT timer for the LBT spectrum sensing has expired; and if the LBT timer has expired, send a failure message to the CU and terminate the LBT process; or if the LBT timer has not expired, determine that a current time is a start time (Tstart) and whether a channel is not acquired; and if no channel is acquired, increment the Tstart by $x(T_{start}=T_{start}+x)$ and continue the LBT spectrum sensing. The RRU can be further configured to: determine if a channel is acquired at time Tacq; and if no channel is acquired, discard any expired symbols from a buffer of the RRU and buffer any newly received data; and continue the LBT spectrum sensing. The RRU can be further configured to:

if the channel is acquired, send an LBT PDSCH success message to the CU;

send a reservation signal OTA until $T_{start}$;

send the buffered data OTA and update Tstart as $T_{start}=T_{start}+B_{RU}$;

determine if the buffered data is less than the buffer depth of the RRU $B_{RU}$; and if so, continue to send the buffered data OTA; and if the remaining buffered data is not less than the buffer depth of the RRU $B_{RU}$, send the remaining buffered data OTA and perform a data reception check.

In an embodiment, the present disclosure provides system comprising: a Baseband Unit (BBU) configured to calculate average occupancy ratios of all the valid channel combinations and select a channel with the minimum occupancy ratio if the difference between the two least average occupancy ratios is larger than a threshold.

In an embodiment, the present disclosure provides method for an eNB, and a system and devices therefor, comprising:

selecting a cell to be added to a user equipment (UE) using a weighted sum of factors, the selecting comprising checking a plurality of cell loads of both licensed and unlicensed cells in accord with a criterion;

checking a plurality of channel gains of both licensed and unlicensed cells in accord with the criterion;

if all licensed channels are loaded, using unlicensed channels for new UEs; and swapping between UEs in licensed and unlicensed channels based on the UE capabilities. The criterion can be selected from criteria including:

determining if a licensed cell load is smaller than a predefined threshold, wherein the Enb adds the licensed cell to the UE if the licensed cell load is smaller than the predefined threshold; and determining if the difference between the licensed cell load and an unlicensed cell load is less than a predefined threshold, wherein the Enb adds the licensed cell to the UE if the difference between the licensed cell load and the unlicensed cell load is less than the predefined threshold.

In an embodiment, the present disclosure provides a system comprising:

a Remote Radio Unit (RRU) configured operate on an optimal channel to use from an unlicensed band, wherein the RRU is configured to perform periodic measurements of channels and report these measurements to a Control Unit (CU) of a Baseband Unit (BBU); and wherein the CU is configured to use the measurements to select the optimal channel to use and reconfigures the RRU to use the selected optimal channel. The CU can be configured to employ instructions for dynamic frequency selection in accord with $R_o(f_c^*) \geq R_o^{th}$ or $P(f_c^*) \geq P^{th}$ to select an optimal channel based on the RRU measurements.

In an embodiment, the present disclosure provides a system comprising:

a Baseband Unit (BBU) comprising a Control Unit (CU) configured to transmit a pilot message to a Remote Radio Unit (RRU) ahead of a data transmission connection time to compensate for a fronthaul latency; and wherein the RRU is configured to reply to the BBU with messages indicating a time the RRU can receive the pilot message, and wherein the CU is configured to adapt a transmission rate to the RRU based on the buffer size at the RRU and the fronthaul latency.

In an embodiment, the present disclosure provides a method, and a system and devices therefor, comprising:

transmitting, from a lower layer a Baseband Unit (BBU) to a layer of a Remote Radio Unit (RRU), via a fronthaul interface, a discovery reference signal (DRS) transmission; wherein a Control Unit (CU) of the BBU is configured to:

send the DRS signal at a time $DRS_{th,1}$ or a time $DRS_{th,2}$;

send an LBT DRS request at a target subframe for Listen Before Talk (LBT) sensing; and determine if a discovery measurement timing configuration (DMTC) offset time has passed; and if so, send the DRS transmission.

In the embodiment, the CU can be further configured to:

if the CU determines if the discovery measurement timing configuration (DMTC) offset time has not passed, determine if a current time is $DRS_{th,1}$ or $DRS_{th,2} \cdot (T_{now}=DRS_{th,1}$ or $T_{now}=DRS_{th,2}?$); and if so, send the DRS. The CU can be further configured to:

if the CU determines a current time is not the time $DRS_{th,1}$ or the time $DRS_{th,2}$ ($T_{now}=DRS_{th,1}$ or $T_{now}=DRS_{th,2}?$), determine if the RRU has received an LBT DRS request; and if not, determine if the DMTC offset time has passed and continue the DRS transmission;

if the CU determines the RRU has received the LBT DRS request, determine if the outcome is successful, and if so, end the DRS transmission;

if the CU determines the LBD DRS request was not successful, determine if the DMTC offset time has passed and continue the DRS transmission process.

In the embodiment, the RRU can be configured to:

determine if the DRS is received, and if so, buffer the DRS;

if the DRS is not received, continue to listen for the DRS;

if the DRS is buffered, determine if the RRU has received an LBT DRS request from the CU; and if so, determine if the discovery measurement time window (DMTC) offset time has passed, and if so, terminate the process. The RRU can be configured to:

if the DMTC offset time has not passed, determine if a new DRS has been received;

if not, start an LBT spectrum sensing at a configured time;

if a new DRS has been received, drop the existing buffered DRS and buffer a new DRS; and start the LBT spectrum sensing at the configured time. The RRU can be further configured to: determine if the LBT spectrum sensing is successful; if not, send an LBT DRS failure response to the CU; determine if the DMTC offset time has passed; if so, send an LBT DRS success response to the CU, and send the DRS over the air to the target device.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Detailed Description, which is to be read in association with the accompanying drawings.

FIGS. 4-10 are embodiments of licensed-assisted access (LAA) supported data transmission.

DETAILED DESCRIPTION OF THE EMBODIMENTS

Figure 1:
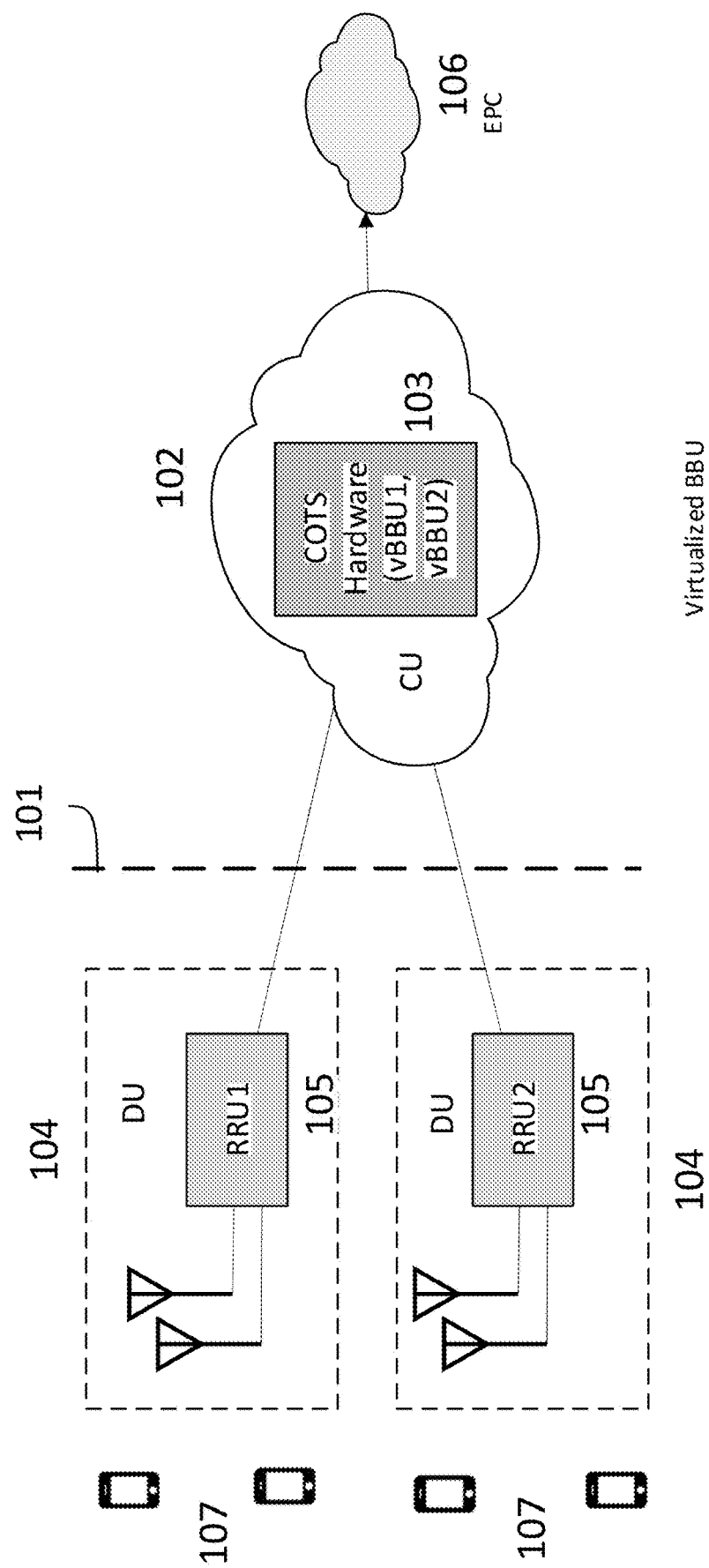
FIG. 1 is an example of a C-RAN system architecture and a functional fronthaul split.

Reference is made to Third Generation Partnership Project (3GPP) system, in accordance with embodiments of the present disclosure. The present application employs abbreviations, terms and technology defined in accord with Third Generation Partnership Project (3GPP) technology standards, including the following standards and definitions. 3GPP technical specifications (TS) and technical reports (TR) incorporated in their entirety by reference herein, define the related terms and architecture reference models that follow.

ABBREVIATIONS

3GPP: Third generation partnership project
ARQ: Automatic repeat request
BBU: Baseband unit
BPSK: Binary Phase Shift Keying
CA: Carrier aggregation
CBRS: Citizens Broadband Radio Services
CC: Component carrier
CCA: Clear channel assessment
CCE: Control Channel Element(s)
CMS: Centralized Management System
CoMP: Coordinated multipoint transmission
COTS: Commercial off-the-shelf
CP: Cyclic prefix
CQI: Channel quality indicator
C-RAN: Cloud radio access network
CRC: Cyclic redundancy checking
CRS: Cell-specific reference signal
CSAT: Carrier-sense adaptive-transmission
CSI: Channel state information
CSI-RS: Channel state information—reference signal
CU/IIs-CU: Central unit. In this document, CU and IIs-CU are used interchangeably, and refers to the central unit or the processing unit in the cloud that communicates with an RU/RRU (radio unit/remote radio unit).
DCI: Downlink control indicator
DFS: Dynamic frequency selection
DM-RS: Demodulation—Reference Signal
DRS: Discovery Reference Signals
DMTC: Discovery measurement timing configuration
DL: Downlink
DU: Distribution unit
EPC: Evolved Packet Core
E-UTRA: Evolved Universal Terrestrial Radio Access
eNB: Evolved Node B
FDD: Frequency-division duplex FEC: Forward error correction
FFT: Fast Fourier Transform
iFFT: Inverse Fast Fourier Transform
ISM radio bands: Industrial, scientific and medical radio bands
HARQ: Hybrid automatic repeat request
HARQI: Hybrid automatic repeat request information
IoT: Internet of things
JP: Joint processing
JR: Joint reception
KPI: Key performance indicator
LAA: Licensed-assisted access
LBT: Listen-before talk
IIs: Lower-layer split
LCM: Life cycle management
LTE: Long term evolution
LTE-A: LTE Advanced
MAC: Media access control
MBSFN: Multicast-broadcast single-frequency network
MCOT: Maximum channel occupancy time
MCS: Modulation and coding scheme
MIB: Master Information Block
MIMO: Multiple input, multiple output
MMSE-IRC: Minimum mean square error—interference rejection combining
MMSE-MRC: Minimum mean square error—maximum-ratio combining
mmWave: Millimeter wave
MNO: Mobile network operator
NR: New radio
OAM: Operation and management
OSS: Operator service system
OTA: Over the air
PBCH: Physical broadcast channel
PCFICH: Physical control format indicator channel
PDCCH: Physical downlink control channel
PDCP: Packet data convergence protocol
PDSCH: Physical downlink shared channel
PHICH: Physical hybrid ARQ indicator channel
PHY: Physical layer
LPHY: Lower physical layer
UPHY: Upper physical layer
PNF: Physical network function
P-SS: Primary synchronization signal
PUCCH: Physical uplink control channel
PUSCH: Physical uplink shared channel
QAM: quadrature amplitude modulation
QPSK: Quadrature phase shift keying
RACH: random access channel
PRACH: physical random access channel
REST API: Representational state transfer application programming interface
RF: radio frequency interface
RI: rank indicator
RLC: Radio link control
RRC: Radio resource control
RRM: Radio resource management
RU/RRU: Radio unit/remote radio unit. In this document, RU and RRU are used interchangeably.
RS: reference signal
RSSI: received signal strength indicator
SCell: Secondary cell
SF: Subframe
SFN: System frame number
SIMO: single input, multiple output
SINR: signal-to-interference-plus-noise ratio
SON: Self-Organizing Network
SRS: Sounding reference signal
S-SS: Secondary synchronization signal
TB: transport block
TTI: Transmission time interval
TDD: Time division duplex
TPC: Transmission power control
UCI: Uplink Control Information
UE: user equipment
UL: uplink
UL DMRS: uplink demodulation reference signal
ULSCH: Uplink shared channel
UNII radio band: Unlicensed National Information Infrastructure radio band
vBBU: Virtualized baseband unit
VNF: Virtual network function The present disclosure provides embodiments of systems, devices and methods for LTE operation in unlicensed and shared spectrum for Cloud RANs such as Licensed-Assisted Access (LAA), MulteFire, Citizens Broadband Radio Services (CBRS), and the like.

The present disclosure refers to data transmission over the air (OTA) by PDSCH transmission OTA. However, it is understood that the same procedures/methods are applied for other channels/signals (e.g. reference signals, control channels, and the like) that are multiplexed with PDSCH.

FIG. 1 is an example of a C-RAN system architecture 100 and a functional fronthaul split 101 for cloud RAN 100 with a Central Unit (CU) 102 including a BBU 103 or BBU pools 103 and one or more Distributed Units (DU) 104 including an RRU/RU. The BBU pools 103 can be connected to other BBU pools and connected to the evolved packet core (EPC) network 106 via an S1 interface. The RRUs 105 connect User Equipment (UE) 107 to the network.

For the RRU 105 to operate and access the unlicensed/shared spectrum, various embodiments of modules are incorporated in the cloud RAN and configured for functions such as carrier-selection, Listen-Before-Talk (LBT), dynamic frequency selection (DFS), reference signals transmission (e.g., Discovery reference signal or DRS), and the like.

Embodiments as described herein address the challenges in enabling LTE technologies in unlicensed bands, which come from the fact that the separation between different LTE layers can introduce communication latency between layers that go into the BBU 103 and those that go into the RRU 105. The uncertainty in accessing the spectrum due to spectrum sensing execution introduces another problem for C-RAN, especially when combined with the fronthaul latency in the BBU 103-RRU 105 connection. One of the main constraints in LAA is that an RRU 105 is configured to seize the spectrum right after LBT success (i.e., within a sensing slot of 9 µseconds) to prevent other Wi-Fi/eNB from using the channel. Embodiments as described herein address the fronthaul latency (from few hundreds of µseconds to a few milliseconds) to implement LAA in C-RANs.

The present disclosure provides embodiments of systems, methods and apparatuses or devices for enabling LTE operation in the unlicensed/shared spectrum on a lower-layer (Intra-PHY, MAC-PHY, and the like) split between the CU 102 and the DUs 104. These embodiments maximize the efficiency of the transport and allow the flexibility to support many of the features required for virtualization and commercialization of C-RAN technology. Although the present disclosure describes embodiments for using the unlicensed spectrum for LTE operation for C-RAN, various embodiments are also applicable to licensed LTE operation for C-RAN. Various embodiments are also applicable to unlicensed LTE operation for conventional RANs as well as C-RANs.

In conventional LTE networks, the LTE functionalities and the layers of the LTE protocol stack reside in the eNB small cell, which is deployed on site. There are multiple benefits of the C-RAN solution (i.e., splitting the BBU 103 and the RRU) as compared to traditional LTE networks.

C-RAN provides flexibility to the Mobile network operators ("MNO") to be able to optimize system performance in real-time by varying various configuration and system parameters using the cloud-based infrastructure.

As new wireless technologies and standards appear, MNOs are required to upgrade their eNB small cells, which is usually accompanied by high costs. In C-RAN, most of the LTE functionalities in the BBU 103 can be software-based, which can be easily upgraded when new wireless technologies appear. This reduces the upgrading costs significantly.

Having a software-based BBU 103 in the cloud has other benefits such as the flexibility in adding new services and the significant reduction in the operation and management (OAM) costs.

To enable the C-RAN solution, the LTE functionalities need to be split between the BBU 103 in the cloud and the RRU 105 onsite.

Figure 2:
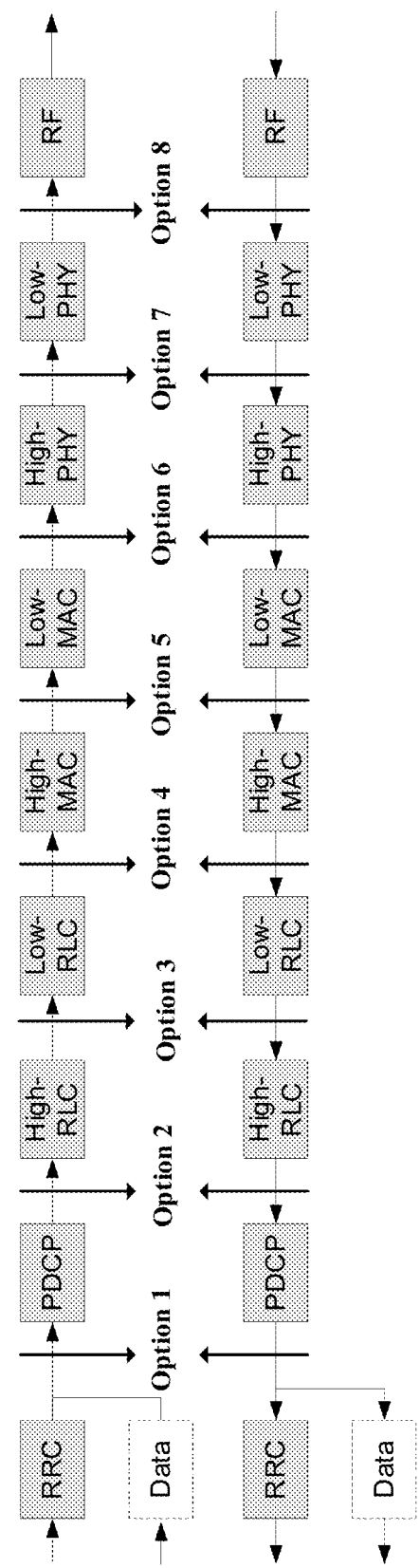
FIG. 2 shows 8 options for the split between a BBU and an RRU.

3GPP has defined 8 options in TR 38.801 V14.0.0 (2017-03) for the split between the BBU 103 and the RRU 105 as shown in FIG. 2, where each set of arrows show the spilt between the layers in the CU 102 on the right and the DU 104 on the left:

Option 1
RRC is in the CU 102. PDCP, RLC, MAC, physical layer and RF are in the DU 104.

Option 2
RRC, PDCP are in the central unit. RLC, MAC, physical layer and RF are in the DU 104.

Option 3 (Intra RLC Split)
Low RLC (partial function of RLC), MAC, physical layer and RF are in the distributed unit. PDCP and high RLC (the other partial function of RLC) are in the CU 102.

Option 4 (RLC-MAC Split)
MAC, physical layer and RF are in the distributed unit. PDCP and RLC are in the CU 102.

Option 5 (Intra MAC Split)
RF, physical layer and some part the MAC layer (e.g. HARQ) are in the DU 104. Upper layer is in the CU 102.

Option 6 (MAC-PHY Split)
Physical layer and RF are in the DU 104. Upper layers are in the CU 102.

Option 7 (Intra PHY Split)
Part of physical layer function and RF are in the DU 104. Upper layers are in the CU 102.

Option 8 (PHY-RF Split)
RF functionality is in the DU 104 and upper layer are in the CU 102.

There are multiple factors affecting the selection of the fronthaul split option, Bandwidth: different split options have different bandwidth requirements, which eventually plays a role in determining the fronthaul design. As an example, option 8 (PHY-RF split) has very high requirements on fronthaul bandwidth, which can imply higher resource consumption and costs in transport dimensioning (link capacity, equipment, and the like). On the other hand, one of the benefits of option 5 (intra MAC split) is that it reduces the bandwidth needed on fronthaul.

Latency: in the LTE protocol stack, the split between the BBU 103 and the RRU 105 affects the latency. For example, splitting between L3 and L2 in option 1 has very low latency requirements. This split option is useful in handling some edge computing or low latency use cases where the user data needs to be located close to the transmission point. Another example is split option 3 within the RLC layer. The split in option 3-1 is more latency sensitive than the split with ARQ in DU 104, since retransmissions are susceptible to transport network latency over a split transport network. On the other hand, option 3-2 is insensitive to the transmission network latency between CU 102 and DU 104. In split option 5 (intra MAC), time critical functions are present in the Low-MAC sublayer which includes the functions with stringent delay requirements (e.g. HARQ) or the functions where performance is proportional to latency (e.g. radio channel and signal measurements from PHY, random access control). This split helps in reducing the delay requirements on the fronthaul interface. On the other hand, option 8 has very high requirements on fronthaul latency, which can cause constraints on network deployments with respect to network topology and available transport options.

Implementation Cost: higher splits usually have high implementation costs compared to lower splits, since lower splits allow for more virtualization. As an example, in split option 8, separation of RF and PHY allows pooling of PHY resources, which may enable a more cost-efficient dimensioning of the PHY layer. Separation of RF and PHY allows operators to share RF components, which can reduce system and site costs. On the other hand, high requirements on fronthaul bandwidth implies higher resource consumption and costs in transport dimensioning (link capacity, equipment, and the like).

Other factors include virtualization benefits, complexity of the fronthaul interface, expansion flexibility, computing power, and memory requirement.

Although the current disclosure presents the standardization of split option 7 (i.e., Intra PHY split) as an example for illustrating the detailed aspects, the present disclosure is not limited to the split option 7 example, and the present disclosure is intended to encompass other split options mentioned above (e.g., split options 5, 6, and 8).

Option 7 (Intra PHY Split)
Multiple realizations of this option are possible, including asymmetrical configurations that obtain benefits for different sub-options for UL and DL independently (e.g. Option 7-1 is used in the UL and Option 7-2 is used in the DL). A compression technique may be able to reduce the required transport bandwidth between the DU 104 and CU 102.

In the UL, FFT, and CP removal reside in the DU 104. Remaining functions reside in the CU 103.

In the downlink, iFFT and CP addition reside in the DU 104. The rest of the PHY resides in the CU 103.

Figure 3:
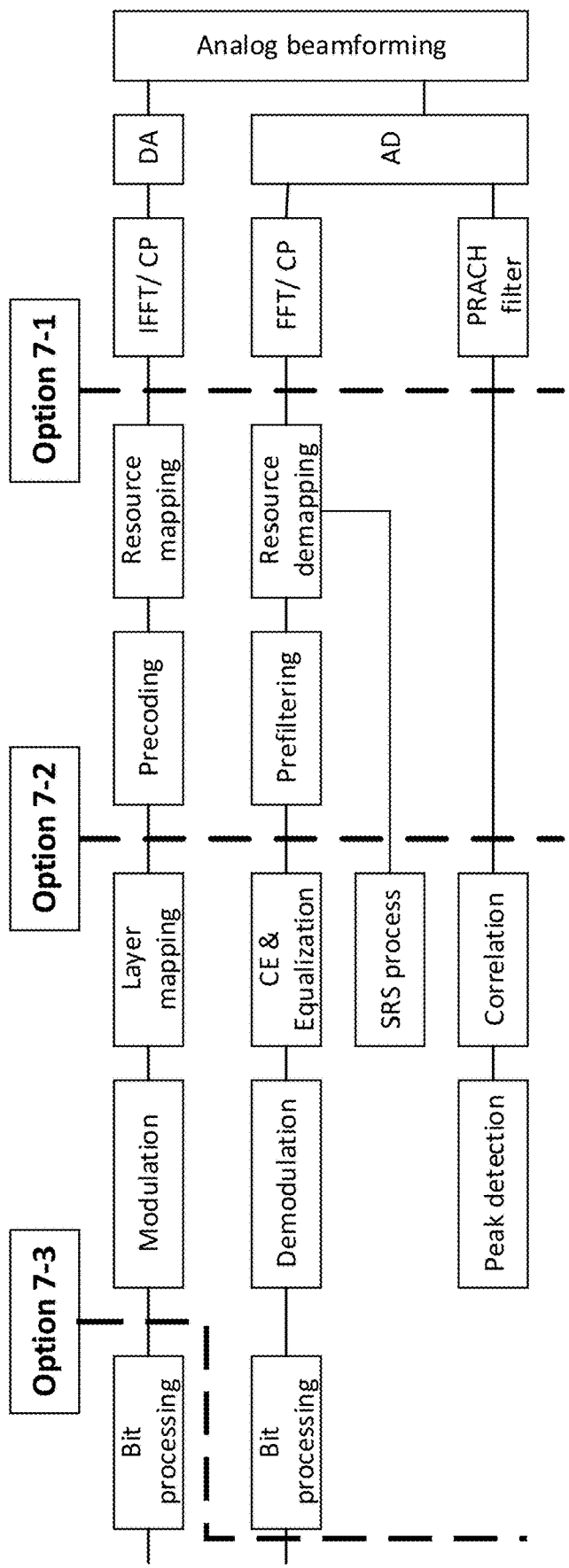
FIG. 3 are various embodiments of an intra-PHY split option.

FIG. 3 illustrates various embodiments of the intra-PHY split option 7 and the associated tradeoffs.

Common Among Options 7-1, 7-2 and 7-3:
Options 7-1, 7-2 and 7-3 allow traffic aggregation from NR and E-UTRA transmission points to be centralized. Additionally, they can facilitate the management of traffic load between NR and E-UTRA transmission points.

These options are expected to reduce the fronthaul requirements in terms of throughput.

Centralized scheduling is possible as MAC is in CU 102 (e.g. CoMP). Joint processing (both transmit and receive) is also possible with these options as MAC is in CU 102.

Option 7-1

Description:

In the UL, FFT, CP removal and possibly PRACH filtering functions reside in the DU 104, the rest of PHY functions reside in the CU 102.

In the DL, iFFT and CP addition functions reside in the DU 104, the rest of PHY functions reside in the CU 102.

Option 7-1 also allows the implementation of advanced receivers.

Option 7-2

Description:

In the UL, FFT, CP removal, resource de-mapping and possibly pre-filtering functions reside in the DU 104, the rest of PHY functions reside in the CU 102.

In the DL, iFFT, CP addition, resource mapping and precoding functions reside in the DU 104, the rest of PHY functions reside in the CU 102.

Option 7-2 allows the optimal use of advanced receivers.

Option 7-3 (Only for DL)

Description:

Only the encoder resides in the CU 102, and the rest of PHY functions reside in the DU 104.

This option is may reduce the fronthaul requirements in terms of throughput to the baseband bitrates, as the payload for Option 7-3 is encoded data.

As of the present disclosure, present technology fails to provide technological solutions that address, inter alia, the configuration the fronthaul interface between the UPHY and the LPHY in split option 7. The present disclosure describes embodiments that enable LTE operation in unlicensed and shared spectrum for C-RANs.

LAA

Carrier aggregation (CA) with at least one SCell operating in the unlicensed spectrum is referred to as LAA. While the present disclosure describes embodiments for technology for LAA, embodiments are also applicable to other unlicensed spectrum technologies such as Multefire, CBRS spectrum and the like. In LAA, the configured set of serving cells for a UE therefore includes at least one SCell operating in the unlicensed spectrum according to frame structure Type 3, also called LAA SCell. Unless otherwise specified, LAA SCells act as regular SCells.

The range 5150-5925 MHz, or parts thereof, is potentially available for license-assisted access to unlicensed operation. This represents a significant amount of spectrum that can be used by operators to augment their service offerings in licensed bands. The range above can be operated under a license-exempt regime or ISM but must be shared with existing mobile services and other incumbent services.

The quality of service offered by a licensed regime can therefore not be matched. Hence, unlicensed access is viewed as complementary, and does not reduce the need for additional allocations for licensed operation in view of the increased demand for wireless broadband access. There are different regulatory requirements for different regions and bands, which are described in 3GPP TR 36.889 V13.0.0 (2015-06), the entirety of which is incorporated by reference herein. 3GPP provides specifications that can work for all regions.

LAA Configuration

Described are embodiments of an LAA configuration.

LAA provides a single global solution framework allowing compliance with any regional regulatory requirements. A single global solution framework for LAA is optimally defined to ensure that LAA can be operated according to any regional regulatory requirements. Furthermore, LAA design should provide sufficient configurability to enable efficient operation in different geographical regions. The LAA configurations optimally target fair coexistence with existing Wi-Fi networks to not impact Wi-Fi services more than an additional Wi-Fi network on the same carrier, with respect to throughput and latency. The LAA configuration optimally target fair coexistence among LAA networks deployed by different operators so that the LAA networks can achieve comparable performance, with respect to throughput and latency.

LAA Functionalities

Listen-before-talk (clear channel assessment).

The listen-before-talk (LBT) procedure is defined as a mechanism by which a user equipment applies a clear channel assessment (CCA) check before using the channel. The CCA utilizes at least energy detection to determine the presence or absence of other signals on a channel to determine if a channel is occupied or clear, respectively. European and Japanese regulations mandate the usage of LBT in the unlicensed bands. Apart from regulatory requirements, carrier sensing via LBT is one way for fair sharing of the unlicensed spectrum and hence it is a feature for fair and friendly operation in the unlicensed spectrum in a single global solution framework.

Discontinuous transmission on a carrier with limited maximum transmission duration.

In unlicensed spectrum, channel availability cannot always be guaranteed. In addition, certain regions such as Europe and Japan prohibit continuous transmission and impose limits on the maximum duration of a transmission burst in the unlicensed spectrum. Hence, discontinuous transmission with limited maximum transmission duration is a required functionality for LAA.

Dynamic frequency selection for radar avoidance in certain bands/regions.

Dynamic frequency selection (DFS) is a regulatory requirement for some frequency bands, e.g., to detect interference from radar systems and to avoid co-channel operation with these systems by selecting a different carrier on a relatively slow time scale.

Carrier Selection

As there is a large available bandwidth of unlicensed spectrum, carrier selection is required for LAA nodes to select the carriers with low interference and achieve good co-existence with other unlicensed spectrum deployments.

Transmit Power Control

Transmit Power Control (TPC) is a regulatory requirement in some regions by which the transmitting device should be able to reduce the transmit power in a proportion of 3 dB or 6 dB compared to the maximum nominal transmit power.

RRM Measurements Including Cell Identification

Radio resource management (RRM) measurements, including cell identification, enable mobility between SCells and robust operation in the unlicensed band.

Automatic Gain Control (AGC) setting, coarse synchronization, fine frequency/time estimation at least for demodulation, Channel-State Information (CSI) measurement, including channel and interference.

These are for performing RRM measurements and for successful reception of information on the unlicensed band.

Discovery Reference Signal (DRS)

DRS is described in TS 36.211 V14.3.0 (2017-06) to support small-cell on/off where secondary CCs can be turned off except for periodic transmission of DRS. DRS is used by the UE to perform mobility measurements and to maintain synchronization. The signals comprising the DRS include the PSS, SSS, CRS, and optionally, the CSI-RS.

The UE is configured with a discovery measurement timing configuration (DMTC), which is a time window in which the UE can expect the DRS to be received.

While the DRS occasion may occur anywhere in the DMTC, the UE can expect the DRS to be transmitted from a given cell so that the duration between successive DRS transmissions is fixed (e.g., 40, 80 or 160 milliseconds).

LBT requirements in some regions may allow the DRS to be transmitted as a short control transmission without LBT (however this is not allowed in some regions, e.g., Japan).

DRS are used also in LAA (preceded by CCA) and are the basis for radio-resource management including cell identification.

If LBT is applied to DRS transmissions, there can be some instances where the DRS is not able to be transmitted in a periodic manner (e.g., DRS transmitted on a cell in licensed spectrum). The following two options may then be considered for DRS design for LAA.

1) Subject to LBT, DRS is transmitted in fixed time position in the configured DMTC.

2) Subject to LBT, DRS is allowed to be transmitted in at least one of different time positions in the configured DMTC.

Two cases for DRS transmission.

Case 1:

If the DRS is transmitted together with the PDSCH: automatically subject to the LBT CAT 4.

Simultaneous transmission (or multiplexing) of a DRS and PDSCH is possible in subframes 0 and 5 only.

Case 2:

If the DRS is not part of a transmission burst, the DRS must be preceded by a CCA spanning 25 μs (i.e., LBT CAT 2).

Since the exact time when the DRS is transmitted depends on the CCA, the discovery signal can move around in time and the device needs to detect whether a DRS is transmitted or not before basing measurements on it. This is not necessary in the licensed spectrum.

For traditional RANs (or for upper-layer splits), where the MAC, scheduler, PHY, and RF are all in the same box, the RRU 105 contend for the spectrum using LBT techniques. Once the LBT is successful, the PHY informs the scheduler/MAC about the target subframe/slot to start transmission. The scheduler/MAC, in return, sends the data that needs to be transmitted OTA. The RRU 105 then transmits this data OTA. As will be appreciated, there is conventionally very low or no communication latency between lower layers. As of the present disclosure, no work exists for implementing unlicensed LTE technologies for lower-layer splits. As will be appreciated, embodiments can also be applied to other unlicensed LTE technologies, such as MulteFire and CBRS.

FIG. 4 shows a shading code used in the following FIGS. 4-10. One requirement for supporting LAA in CRAN with non-ideal fronthaul is that the BBU 103 are forced to send the scheduled data ahead of time to the RRU 105. This is because the RRU 105 should acquire the channel (and transmit data OTA) right after finishing spectrum sensing (within 9 μsec). Data originated from the BBU 103 is TTI-specific (i.e., data transmitted in the TTI is function of the specific TTI index) due to the presence of reference signals. However, the BBU 103 does not know the specific TTI where the RRU 105 starts transmission in since this depends on multiple random variables such as the number of eNB and Wi-Fi APs sharing the spectrum, LBT outcome, interfering channels, and the like.

In FIGS. 4-10, described are embodiments of methods to address non-ideal LAA support as described above. Let MCOT=N ms (e.g., N=8 ms for priority class 3 and 4 when Wi-Fi is allowed to use the channel. The RRU 105 transmits on only, for example, 7 ms since the first subframe is usually wasted in sending the reservation signals after LBT success. Assumption: no partial subframes). Although use N=8 is employed as an example in the following figures, embodiments are not restricted a specific priority class or a specific MCOT duration.

Note also that some of the following exemplary embodiments do not only apply to the data transmission, but also apply to the DRS transmission. The DRS duration is much shorter than data (around 12 OFDM Symbols<1 ms).

Embodiment 1

FIG. 5 shows an embodiment, where L2 (BBU) sends, via the fronthaul interface, N−1 ms data to LPHY (RRU) assembled based on the assumption that OTA transmission starts only at a specific pre-defined subframe. In this example, data transmission is fixed to be started, for example, at subframe 0, however, both the BBU 103 and RRU 105 can agree on any other subframe index.

This data is sent few msecs ahead of the time the RRU 105 is supposed to do the LBT. As an example, the BBU 103 can send the data to the RRU 105, for example, 30 msec, before the start of the LBT process for that specific data.

In every LTE frame, the RRU 105 contends for the channel at the beginning of the subframe preceding the target subframe for data transmission. In the present example, the RRU 105 contends in subframe 9 of every frame.

Next, if the RRU 105 gets access before the end of subframe 9 it sends reservation signal till the end of subframe 9, then transmits the N−1 subframes OTA.

If the RRU 105 does not get access before the end of subframe 9, it keeps silent and re-contend again at the following 9th subframe.

Exemplary advantages of the embodiment include a simple scheduler design where an amount of data scheduled is fixed and there is no dropping to subframes. Another advantage is optimized operation when no other technology is sharing the spectrum since not many subframes are wasted.

In another aspect of the embodiment, the method can be applied for DRS transmission. The DRS location is fixed at a specific subframe (e.g., subframe 0 every DMTC period). The BBU 103 sends the DRS signal to the RRU 105 one or two subframes before the scheduled subframe (e.g., Subframe 8). The RRU 105 contends for the channel at the preceding subframe (e.g., subframe 9). If channel is idle, the RRU 105 sends the DRS signals at subframe 0, for example. If channel is busy, the RRU 105 skips DRS transmission and re-contends for the channel after DMTC.

Embodiment 2

FIG. 6 shows an embodiment where L2 in the BBU 103 sends, via the fronthaul interface, 10 ms, for example, worth of data to the LPHY in the RRU 105. The RRU 105 contends for the channel as soon as getting the DL data at any subframe (i.e., no restrictions on the subframe used for LBT).

Once the RRU 105 gets channel access, it drops the 10−N+1 subframes that do not overlap with OTA transmission and transmit the remaining N−1 subframes. For example, if the RRU 105 gets LBT idle on subframe 7

(assume N=8), the RRU will drop 3 subframes (subframes 5, 6, and 7) and transmit on subframes 8, 9, 0, 1, 2, 3, and 4.

An RLC layer is configured to take care of the dropped subframes and retransmit them on licensed carriers.

An exemplary advantage of the embodiment includes that the RRU 105 contends for the channel at any point in time, hence there is no latency in spectrum sensing and more spectrum efficiency is achieved.

In another aspect of the embodiment, assuming: MCOT=10 ms (as an example), the BBU 103 sends 10 ms worth of data to the RRU 105. The RRU 105 contends for the channel any time once it receives the data from the BBU 103. The RRU 105 then re-organizes the data based on the subframe it gets access to the channel. For example, if the RRU 105 starts transmission on subframe 3 (as an example), it pads the data scheduled for subframes 0, 1, and 2 to the end of the MCOT. In this case, the RRU 105 transmits subframes 3-9, then subframes 0, 1, and 2.

Embodiment 3

Figure 7:
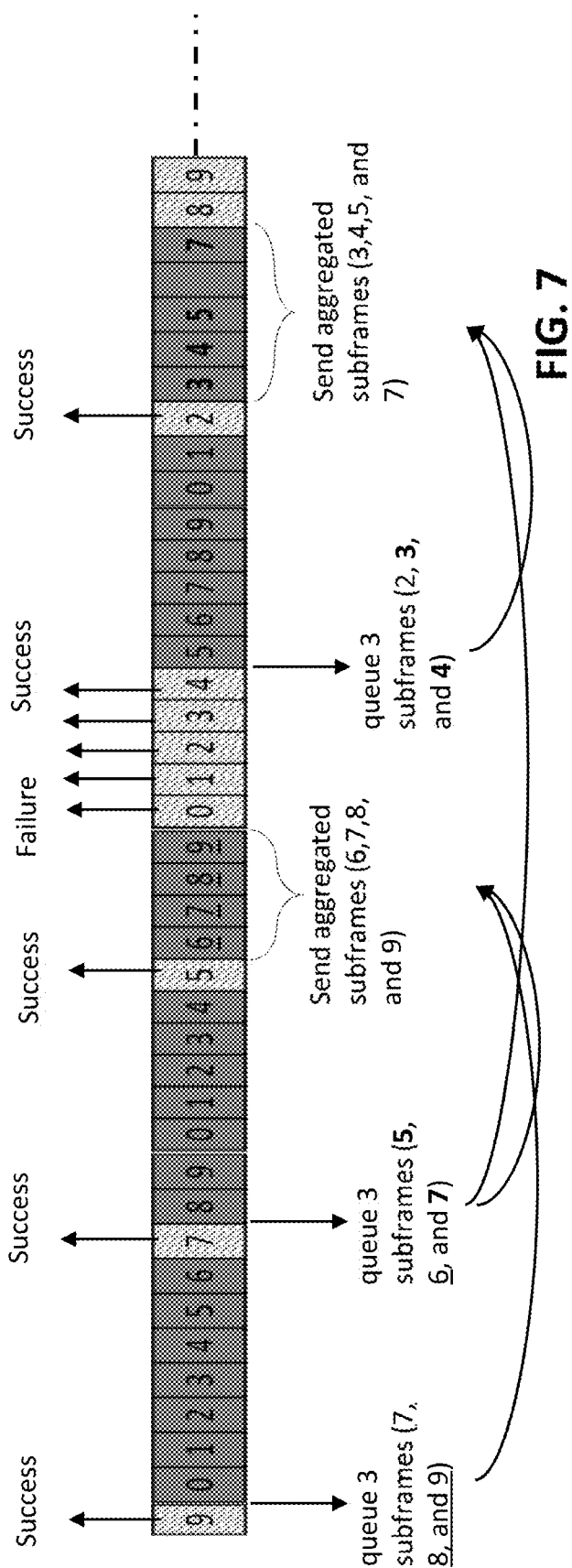

FIG. 7 shows an embodiment, which is a modification of Embodiment 2.

The RRU 105 drops 3 subframes (assuming N=8) for every frame based on LBT success time. In embodiment 3, the RRU 105 queued these subframes into a buffer. The RRU 105 then re-contends for smaller MCOT (to transmit the dropped subframes) whenever a chance is available (e.g., no data at RRU 105 buffer, no strict latency requirement on regular data at RRU 105 buffer, and the like). Since the queued data (remained from previous frames) are assembled to be transmitted on specific subframes, the RRU 105 can use the dummy/reservation signal to block the channel until the target time occurs.

The RRU 105 maps dropped subframes to corresponding OTA subframe for correct positioning of reference signals and a PDCCH CCE index. Furthermore, the RRU 105 can block the channel in between subframes based on the subframe index of the remaining data. If data exists at the RRU 105 buffer, the RRU 105 can aggregate the dropped subframes and transmit them once subframes can be aggregated in a single MCOT (or in a transmission with duration less than the MCOT). The RRU 105 can maintain two buffers; one for traditional data and another one for aggregated subframes.

An exemplary advantage of the embodiment includes that the RRU 105 contends for the channel at any point in time, hence no latency in spectrum sensing and more spectrum efficiency is achieved. Another exemplary advantage is the decreased probability of dropping subframes.

Embodiment 4

Figure 8:
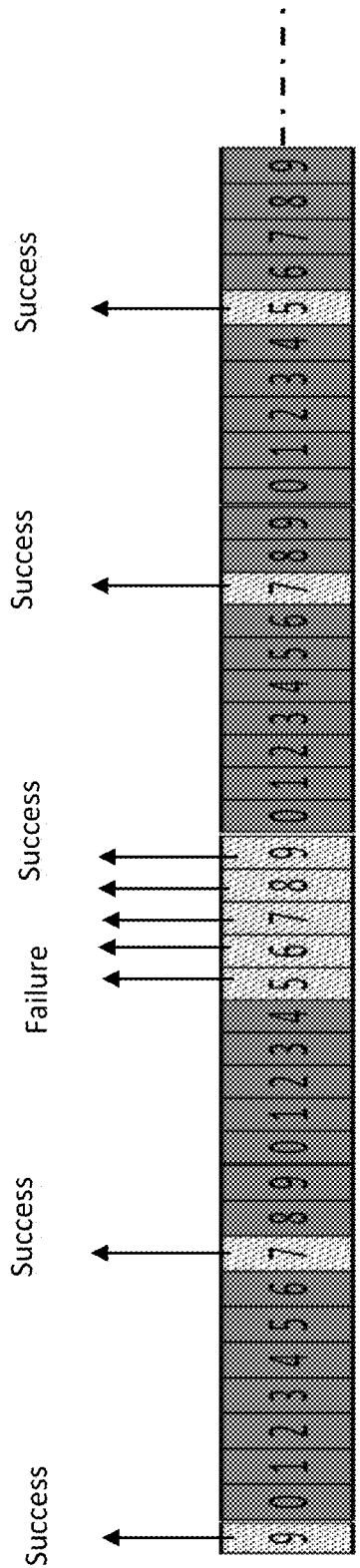

FIG. 8 shows an embodiment where the reference signals are generated in the RRU 105 instead of the BBU 103. L2 (BBU 103) sends only PDSCH to L1 (RRU 105) with all the resource elements (REs) for reference signals empty (PSS/SSS/CRS, and the like). The RRU 105 assembles these reference signals based on the time it gets access to the channel.

An exemplary advantage of the embodiment is high spectrum efficiency (no latency for sensing, no dropped subframes).

Embodiment 5

Figure 9:
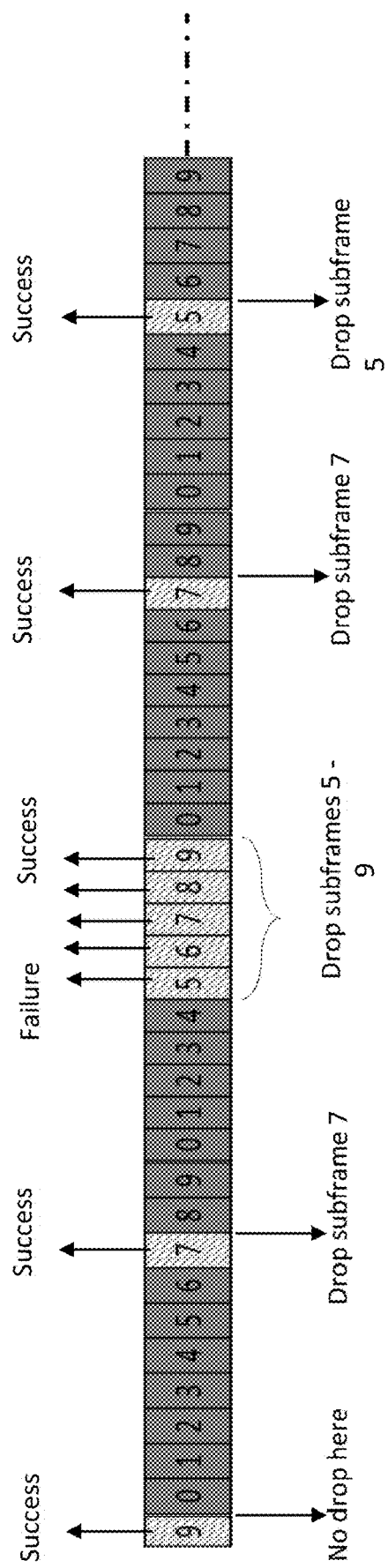

FIG. 9 shows an embodiment, which is a modification of Embodiment 2.

The RRU 105 applies more intelligence in dropping subframes from transmission burst. The BBU 103 sends, via the fronthaul interface, 10 ms (as an example) data to the RRU 105. The RRU 105 the transmits data from transmission bursts in continuous manner dropping one subframe for LBT every time. In this case if channel is available, only one subframe will be dropped and RLC overhead will be less. If the channel is busy, the RRU 105 drops the subframes that were scheduled during the LBT process (e.g., in FIG. 6, the RRU 105 drops subframes 5-9). Data dropped at the RRU 105 can be recovered by RLC retransmissions triggered by UE RLC NACKs. RLC retransmissions will always be performed on primary licensed cell.

Embodiment 6

Figure 10:
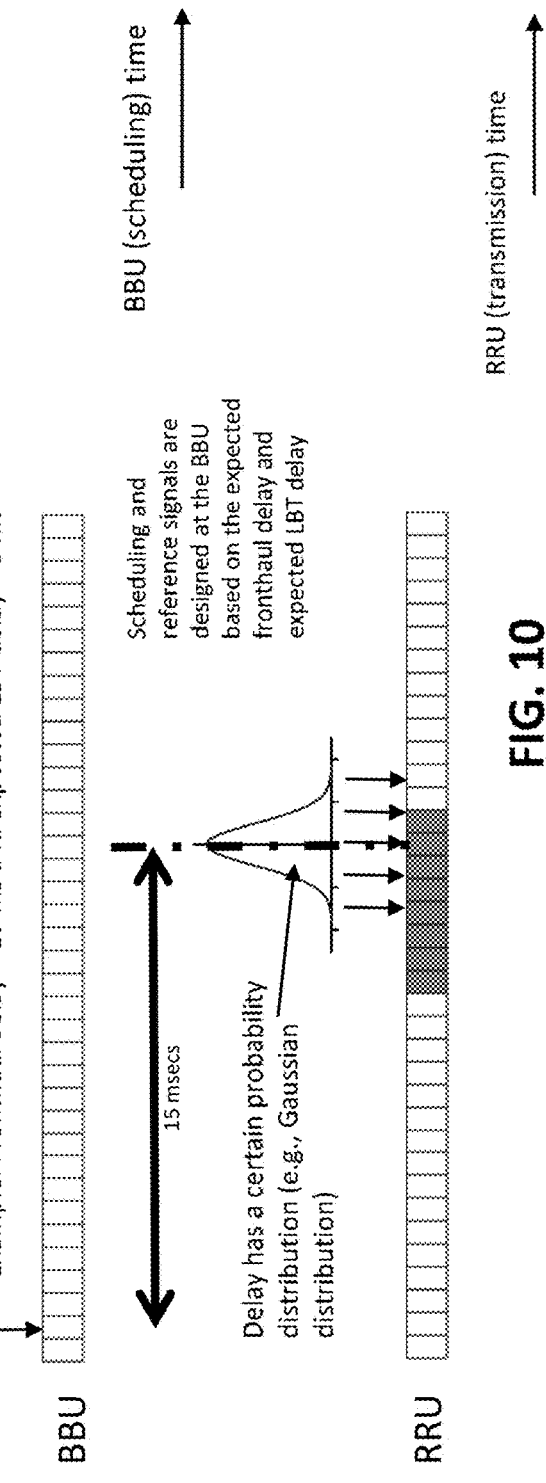

FIG. 10 shows an embodiment in which it is assumed that the fronthaul delay is known to be 10 msec.

The expected time needed to get access to the channel is estimated, i.e., LBT delay profile—as explained below. Multiple copies (e.g., 3 copies) of the TBs for the MCOT duration to the RRU 105 are sent based on the delay profile (most probable delays). The RRU 105 keeps the multiple copies in different queues. Based on the actual time of getting access to the channel, the RRU 105 selects the correct queue and sends the data to the UE. The RRU 105 updates the BBU 103 about the selected copy so that the BBU 103 knows when to expect the HARQ ACK (note that the HARQ ACK has no process number).

It will be noted that the BBU 103 receives the RRU 105 update (i.e., which copy was transmitted) before the corresponding HARQ ACK reaches the MAC at the BBU 103 from the licensed carrier (which is transmitted 4 ms after data reception at the UE). This is under the assumption that the variance of the fronthaul delay is very small.

In various embodiments, this configuration and method can be used for low traffic cases (a small number of UEs with light usage) or applications (e.g., IoT).

An exemplary advantage of the embodiment is high spectrum efficiency.

LBT delay profile.

First: Offline phase:

An LBT delay profile can be estimated empirically offline for different environments and interference conditions (e.g., number of neighboring Wi-Fi STAs, indoor vs. outdoor, and the like). For each delay profile, there will be a LUT for the number of copies and delay taps (for example, 3 copies at n−2, n, and n+2, where n is the subframe index based on the online expected LBT delay).

Second: Online phase, history-based estimation:

At bootup, the RRU 105 runs the LBT code internally (i.e., listen to the medium without actual transmission) and gets estimation about the actual LBT delay. Measurements are signaled to the BBU. Periodically and for low traffic scenarios, the RRU 105 repeats the measurements and reporting to the BBU.

Transmission Phase:

The RRU 105 checks the operating conditions and selects the corresponding delay profile, number of copies, and delay taps.

Embodiment 7

Embodiment 7 is a modification of Embodiment 6. Instead of sending multiple copies of the same data with a different starting transmission time, the vBBU 103 can send different data streams with different starting transmission times to the RRU 105. After getting access to the channel, the RRU 105 selects the stream that best fits the starting TTI. After making the selection process, the RRU 105 reports to the vBBU 103 the selected data stream. Whenever a data stream is outdated, the vBBU 103 is updated as well. The vBBU 103 updates its schedule based on the RRU 105 reports and reschedule expired data streams at the RRU 105 to new LAA transmissions. Once the packets pass a certain delay threshold (waiting for transmission on unlicensed), the RLC layer will retransmit them on the licensed band.

Embodiment 8

In Embodiment 8, first, the TTI-dependent bits are modified at the RRU 105. Then, the LBT delay is estimated. A single transmission (MCOT) is sent to the RRU 105 based on the best estimate. Along with the transmission, pointers are sent to the TTI-dependent bits to the RRU 105, or changes needed at the RRU 105 for different starting times based on the LBT delay profile are sent. The RRU 105 then contends for the medium using LBT and waits for the idle outcome.

Once an idle outcome is received, the RRU 105 either: (a) transmits the received MCOT as it is (if the LBT delay estimation is accurate) or (b) modifies the TTI-dependent bits based on the pointers sent from the vBBU 103 to take into account the change in the starting TTI of the MCOT (if any). The RRU 105 sends an update report to the vBBU 103 about the changes done at the RRU 105.

In the following embodiment, the following sections refer to the XRAN-FH.CUS.0-v01.00.02 (2018-04-04) standard, the entirety of which is incorporated by reference herein, with section headings applicable to Chapter 5, C-plane Protocol.

5.3.2 LAA Commands Transfer Procedure

The LAA Commands Transfer procedure is used to exchange C-Plane messages between the IIs-CU and the RU. The main purpose of these messages is to support the LAA feature in the RU/IIs-CU.

5.3.2.1 LBT Procedure

The LBT procedure is used to configure the RU with the parameters needed to do LBT prior to PDSCH or DRS transmission OTA. The RU needs to report the LBT process outcome (either success or failure) in the indication message.

Figure 11:
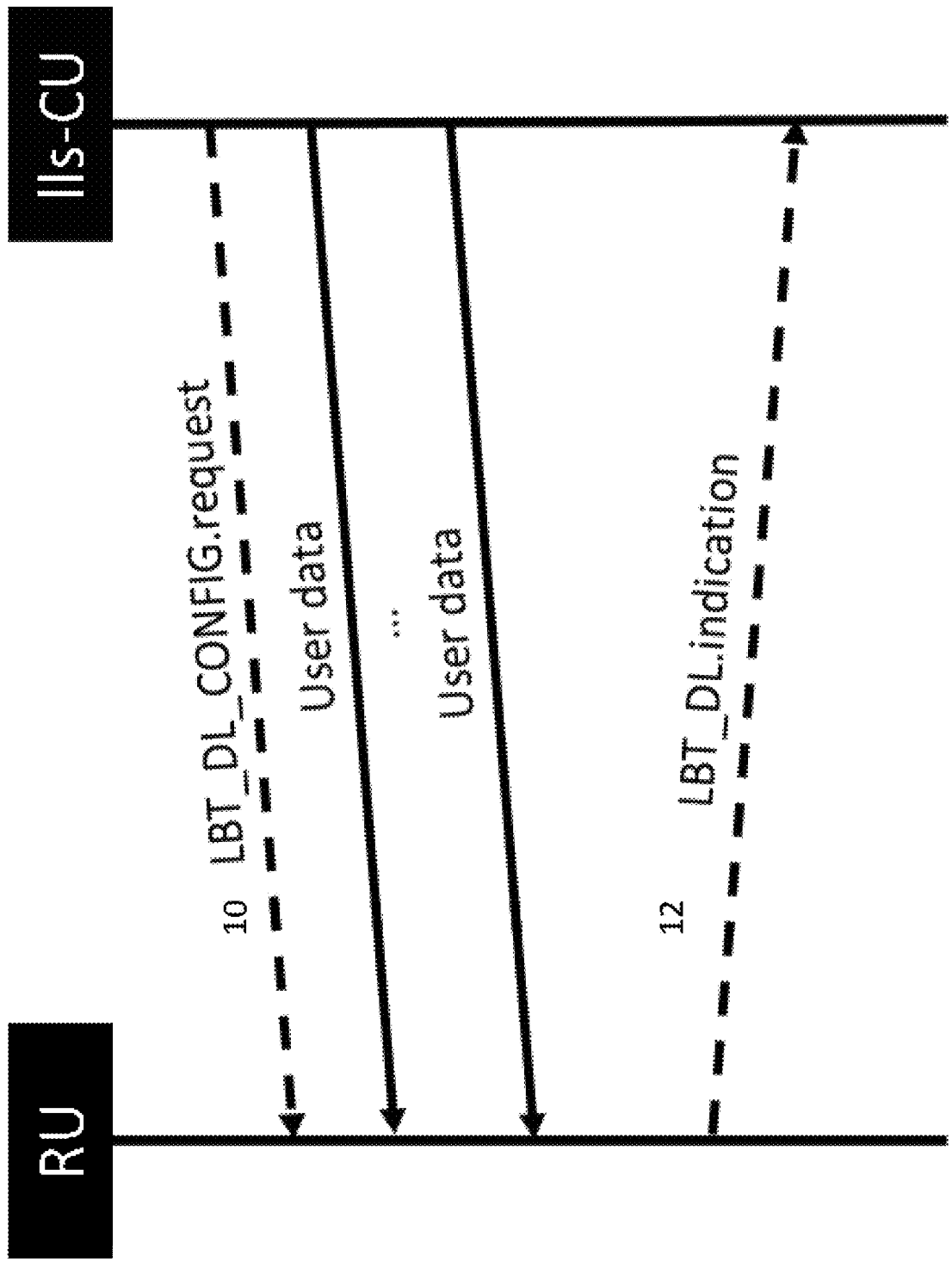
FIG. 11 is an embodiment of messaging between a lower-layer split CU and an RRU.

In contrast to the licensed spectrum, where the RU may continuously send data or reference signals OTA, in the unlicensed spectrum, the RU can only send discontinuous bursts of data (of length MCOT) or periodic DRS signals. In an embodiment, as shown in FIG. 11, a "LBT_DL_CONFIG.request" message 10 is sent once prior to each OTA transmission on the LAA SCell. This includes both DRS and PDSCH (i.e., MCOT burst) transmissions. For every LBT_DL_CONFIG.request message 10, the RU replies with the "LBT_DLindication" message 12 that includes the LBT outcome.

For the DRS signal, initially, the IIs-CU configures the RU with the DRS parameters (DMTC period and DMTC offset) via the M-plane.

Before every DRS period, the IIs-CU sends the LBT_DL_CONFIG.request message and the DRS signal. RU does LBT and transmit the DRS signal OTA. The RU then must send the LBT_DL.indication.

The DRS signal can be transmitted over the fronthaul interface similar to other reference signals such as the PSS/SSS/CRS.

Message fields and settings for the messaging described with respect to FIG. 11 are described below.

5.4 Elements for the C-Plane Protocol 5.4.1 General

C-Plane messages are encapsulated using a two-layered header approach. The first layer has an eCPRI common header and corresponding fields used to indicate the message type, while the second layer is an application layer including necessary fields for control and synchronization. Within the application layer, a "section" defines the characteristics of U-plane data to be transferred or received from a beam with one pattern id. An LAA Section Type 7 is supported in the C-Plane for LAA messages. LAA messages communicated between IIs-CU and the RU in both directions enable LBT for PDSCH/DRS transmission. Initial carrier-selection and dynamic frequency selection (DFS) are enabled by communicating few messages between the IIs-CU and RU using the management plane (M-plane).

Table 1 describes the section types are supported within the C-Plane.

TABLE 1

| Section Type | Target Scenario | Remarks |
| --- | --- | --- |
| 0 | Unused Resource Blocks or symbols in Downlink or Uplink | Indicates to RU that certain Resource Blocks or symbols will not be used (idle periods, guard periods). Likewise, there are no associated U-Plane messages containing IQ data for this Section Type. The purpose is to inform the RU that transmissions may be halted during the specified idle interval for e.g. power-savings or to provide an interval for calibration. |
| 1 | Most DL/UL radio channels | Here "most" refers to channels not requiring time or frequency offsets such as are needed for mixed-numerology channels |
| 2 | reserved for future use | |
| 3 | PRACH and mixed-numerology channels | Channels requiring time or frequency offsets or different-than-nominal SCS values |
| 4 | Reserved for future use | |
| 5 | UE scheduling information (UE-ID assignment to section) | Provides scheduling information for UE-IDs |
| 6 | Channel information | Sends UE-specific channel information from the IIs-CU to the RU |
| 7 | LAA | Messages communicated between IIs-CU and the RU in both directions to enable LBT for PDSCH/DRS transmission, initial carrier-selection, and dynamic frequency selection (DFS) |
| 8-255 | Reserved for future use | |

Section Type "7" fields used to support LAA are as follows:

Common Header Fields
  dataDirection (data direction (gNB Tx/Rx)) field: 1 bit
  payloadVersion (payload version) field: 3 bits
    value="1" shall be set (1st protocol version for payload and time reference format)
  filterIndex (filter index) field: 4 bits
  frameId (frame identifier) field: 8 bits
  subframeId (subframe identifier) field: 4 bits
  slotID (slot identifier) field: 6 bits
  startSymbolid (start symbol identifier) field: 6 bits
  numberOfsections (number of sections) field: 8 bits
  sectionType (section type) field: 8 bits
    value="7" shall be set
  reserved (reserved for future use) field: 8 bits Section Fields
  sectionId (section ID) field: 16 bits
A value="0" shall be set for LBT_DL_CONFIG.request
10: LBT_PDSCH_REQ
  handle (An opaque handling returned in LBT_PDSCH_RSP) field: 16 bits
  deferFactor (Defer factor in sensing slots as described in 3GPP TS 36.213 Section 15.1.1) field: 3 bits
  backoffCounter (LBT backoff counter in sensing slots as described in 3GPP TS 36.213 Section 15.1.1) field: 10 bits
  offset (LBT start time in microseconds from the beginning of the subframe scheduled by this message) field: 10 bits
  MCOT (LTE TXOP duration in subframes) field: 4 bits
  txopSfnSfEnd (SFN/SF by which the TXOP must end) field: 12 bits
  IbtMode (Part of multi-carrier support. Indicates whether full LBT process is carried or partial LBT process is carried (multi carrier mode B according to 3GPP TS 36.213 Section 15.1.5.2) field: 1 bit:
    0—full LBT (regular LBT)
    1—Partial LBT (looking back 25 µsec prior to transmission as indicated in 3GPP TS 36.213 section 15.1.5.2)
A value="1" shall be set for LBT_DL_CONFIG.request
10: LBT_DRS_REQ
  handle (An opaque handling returned in LBT_DRS_RSP) field: 16 bits
  offset (LBT start time in microseconds from the beginning of the subframe scheduled by this message) field: 10 bits
  sfnSfEnd (SFN/SF by which the DRS window must end) field: 12 bits
  IbtMode (Part of multi-carrier support. Indicates whether full LBT process is carried or partial LBT process is carried (multi carrier mode B according to 3GPP TS 36.213 section 15.1.5.2) field: 1 bit:
    0—full LBT (regular LBT)
    1—Partial LBT (looking back 25 µsec prior to transmission as indicated in 3GPP TS 36.213 section 15.1.5.2)
  reserved (reserved for future use) field: 1 bit
A value="2" shall be set for LBT_DLindication 12:
LBT_PDSCH_RSP
  handle (An opaque handling returned in LBT_PDSCH_RSP) field: 16 bits
  IbtResult (LBT result of SFN/SF) field: 1 bit
    0—SUCCESS—indicates that the channel was successfully acquired
    1—FAILURE—indicates failure to acquire the channel by the end of SFN/SF
  lteTxopSymbols (Actual LTE TXOP in symbols. Valid when LBT result=SUCCESS) field: 14 bits
  initialPartialSF (Indicates whether the initial SF in the LBT process is full or partial) field: 1 bit
    0—full SF (two slots, 14 symbols)
    1—partial SF (only second slot, last 7 symbols)
A value="3" shall be set for LBT_DLindication 12:
LBT_DRS_RSP
  handle (An opaque handling returned in LBT_DRS_RSP) field: 16 bits
  IbtResult (LBT result of SFN/SF) field: 1 bit
    0—SUCCESS—indicates that DRS is sent
    1—FAILURE—indicates that DRS is not sent
  reserved (reserved for future use) field: 7 bits 5.4.5 Coding of Information Elements—Application Layer, Sections
Descriptions and coding of information elements of the above referenced fields are as follows:
  5.4.5.19 Handle
Description: This parameter provides a label that is included in the configuration request message (e.g., LBT_PDSCH_REQ, LBT_DRS_REQ) transmitted from the IIs-CU to the RU and returned in the corresponding response message (e.g., LBT_PDSCH_RSP, LBT_DRS_RSP).
Value range: {0000 0000 0000 0000b-1111 1111 1111 1111b}
Type: unsigned integer.
Field length: 16 bits.
  5.4.5.20 deferFactor (Defer Factor)
Description: Defer factor in sensing slots as described in 3GPP TS 36.213 Section 15.1.1. This parameter is used for LBT CAT 4 and can take one of three values: {1, 3, 7} based on the priority class. Four priority classes are defined in 3GPP TS 36.213.
Value range: {001b, 011b, 111b} or {1, 3, 7} in decimal.
Type: unsigned integer.
Field length: 3 bits.
  5.4.5.21 backoffCounter (Backoff Counter)
Description: LBT backoff counter in sensing slots as described in 3GPP TS 36.213 Section 15.1.1. This parameter is used for LBT CAT 4 and can take one of nine values: {3, 7, 15, 31, 63, 127, 255, 511, 1023} based on the priority class. Four priority classes are defined in 3GPP TS 36.213.
Value range: {3, 7, 15, 31, 63, 127, 255, 511, 1023} in decimal.
Type: unsigned integer.
Field length: 10 bits.
  5.4.5.22 Offset
Description: LBT start time in microseconds from the beginning of the subframe scheduled by this message.
Value range: {00 0000 0000b-11 1110 0111b} or {0-999} in decimal Type: unsigned integer.
Field length: 10 bits.
  5.4.5.23 MCOT (Maximum Channel Occupancy Time)
Description: LTE TXOP duration in subframes as described in 3GPP TS 36.213 Section 15.1.1. This parameter can take one of four values: {2, 3, 8, 10} based on the priority class. Four priority classes are defined in 3GPP TS 36.213.
Value range: {0010, 0011, 1000, 1010} or {2, 3, 8, 10} in decimal.
Type: unsigned integer.
Field length: 4 bits.
  5.4.5.24 txopSfnSfEnd (TXOP SFN/SF End)
Description: SFN/SF by which the TXOP must end
Value range: SFN: {0000 0000b-1111 1111b} or {0-255} in decimal, SF: {0000-1001} or {0-9} in decimal.
Type: unsigned integer.
Field length: 12 bits.
  5.4.5.25 IbtMode (LBT Mode)
Description: Part of multi-carrier support. Indicates whether full LBT process is carried or partial LBT process is carried (multi carrier mode B according to 3GPP TS 36.213 Section 15.1.5.2). 0—full LBT (regular LBT). 1—Partial LBT (looking back 25 µsec prior to transmission as indicated in 3GPP TS 36.213 section 15.1.5.2).
Value range: {0, 1}
Type: unsigned integer.
Field length: 1 bit.

5.4.5.26 sfnSfEnd (SFN/SF End)
Description: SFN/SF by which the DRS window must end
Value range: SFN: {0000 0000b-1111 1111b} or {0-255} in decimal, SF: {0000b-1001b} or {0-9} in decimal.
Type: unsigned integer.
Field length: 12 bits.

5.4.5.27 lbtResult (LBT Result)
Description: LBT result of SFN/SF. 0—SUCCESS—indicates that the channel was successfully acquired. 1—FAILURE—indicates failure to acquire the channel by the end of SFN/SF.
Value range: {0,1}
Type: unsigned integer.
Field length: 1 bit.

5.4.5.28 lteTxopSymbols (LTE TXOP Symbols)
Description: Actual LTE TXOP in symbols. Valid when LBT result=SUCCESS.
Value range: For LTE {00 0000 0000 1110b-00 0000 1000 1100b} or {14-140 symbols} in decimal.
Type: unsigned integer.
Field length: 14 bits.

5.4.5.29 initialPartialSF (Initial Partial SF)
Description: Indicates whether the initial SF in the LBT process is full or partial. 0—full SF (two slots, 14 symbols). 1—partial SF (only second slot, last 7 symbols).
Value range: {0, 1}
Type: unsigned integer.
Field length: 1 bit.

Carrier-Selection (Dynamic Frequency Selection)

Since LAA uses unlicensed spectrum for communication, which is shared with Wi-Fi and other technologies, the RRU 105 needs to select the best channel to use from the unlicensed band (e.g., UNII band or band 46). This process needs to be done initially (carrier selection) and periodically (dynamic frequency selection).

Figure 12:
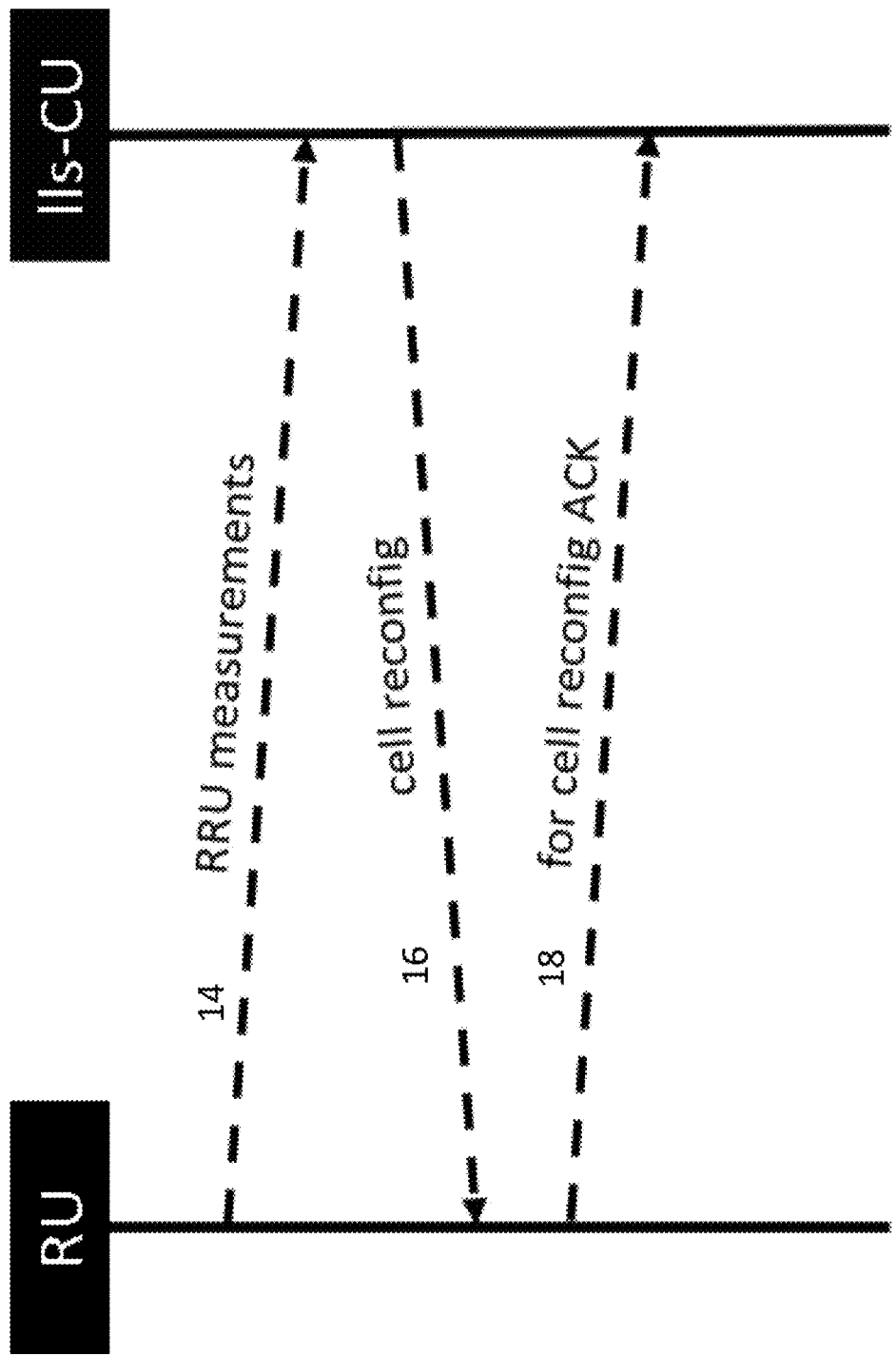
FIG. 12 is an embodiment of messaging between a lower layer split CU and an RRU.

In another embodiment, as shown in FIG. 12, a channel selection and DFS procedure is used by the RU to report initial and periodic RRU 105 channel measurements 14 to the IIs-CU 102. The IIs-CU 102 can send a cell reconfig message 16 to reconfigure the LAA SCell with a new unlicensed channel to operate on based on the received measurements and any other statistics collected during operation. The RRU 105 acknowledges 18 the reception of the cell reconfig message. In the embodiment, for initial carrier-selection (i.e., before OTA transmission), the procedure can be executed once. After starting OTA transmission, this procedure can be executed periodically as configured by the M-plane.

To be able to select the best channel, the RRU 105 performs periodic measurements and reports these measurements to the BBU 103. Different measurements can be executed by the RRU 105 such as calculating the average RSSI, occupancy ratio, and the like.

The BBU 103 uses these measurements to select the "optimal" channel to use and then re-configures the RRU 105 with the new selected channel.

The BBU 103 receives two metrics from the LPHY in the RRU 105 for every channel $f_c \in A$, where A is the set of channels in the unlicensed band (e.g., A={5.745, 5.765, ..., 5.825} if the selected band is the UNII-3, which has five channels):

Occupancy ratio $R_o(f_c)$: Percentage of ON duration to the total measurement duration (e.g., 100 ms).

Average RSSI $\overline{P}(f_c)$: Average RSSI over the total measurement duration.

Next, the present disclosure explains how L3 in the BBU 103 initially selects the unlicensed channel(s) to operate on, and also explains how dynamic frequency selection (DFS) is done periodically to re-select the best channel(s) while minimizing service disruption.

The present disclosure first describes the single LAA SCell case and then moves to the multi-cell case.

Single LAA SCell
Initial Carrier-Selection

The selected channel $f_c^*$ can be calculated using the following method. For illustration purposes, it is assumed that the BBU/RRU are using UNIT-3 band which consists of five channels:

$$f_c^* = \begin{cases} \underset{f_c \in A}{\mathrm{argmin}} \{R_o(f_{C1}), R_o(f_{c2}), ..., R_o(f_{c5})\}, & \text{if } (R_o(f_c^{min+1}) - R_o(f_c^{min})) > R_o^{ThGap} \\ \underset{f_c \in A}{\mathrm{argmin}} \{\overline{P}(f_C^{min}), \overline{P}(f_C^{min+1})\}, & \text{Otherwise} \end{cases}$$

Where $f_c^{min+1}$ indicates the immediate $f_c$ with larger occupancy ratio or RSSI than the minimum one and $R_o^{ThGaP}$ is the threshold gap between the occupancy ratios (e.g., $R_o^{ThGap}=20\%$).

Dynamic Frequency Selection

Described are embodiments of configurations and methods for dynamic frequency selection (DFS) to avoid frequent frequency hopping.

In an embodiment (1), the DFS period is increased to a larger number (e.g., 10 secs) and apply the main equation (i.e., select the best channel every DFS period).

In another embodiment (2), the RRU 105 keeps using the same channel until the $R_o(f_c^*) \geq R_o^{th}$ or $\overline{P}(f_c^*) \geq P^{th}$. Once either condition is satisfied, the BBU 103 is configured to operate employing instructions for DFS in accord with $R_o(f_c^*) \geq R_o^{th}$ or $\overline{P}(f_c^*) \geq P^{th}$ and selects the best channel based on the RRU 105 measurements.

In another embodiment, the system operates in a manner similar to the preceding embodiment (2), while adding constraint on the LBT delay instead. Specifically, the RRU 105 keeps using the same channel (initially selected) until the average LBT delay exceeds a predefined threshold. Once this condition is satisfied, the BBU 103 applies operates employing instructions for DFS in accord with $R_o(f_c^*) \geq R_o^{th}$ or $\overline{P}(f_c^*) \geq P^{th}$ and selects the best channel based on the RRU 105 measurements.

Described are embodiments of configurations and methods where the DFS period is a configurable parameter that can be changed by the BBU 103 based on the channel availability.

Measurements could be done continuously by sniffers in the RRU 105.

In an embodiment (1): the RRU 105 reports summary of measurements averaged over a period of time. In this embodiment, the RRU 105 collects measurements for a period of time locally, processes them, and send the final metrics to the BBU 103 to take a decision about the channel to use. An exemplary advantage of this embodiment is that it reduces the fronthaul overhead. The embodiment also adds more processing in the RRU 105.

In an embodiment (2): RRU 105 reports individual measurements continuously to the BBU 103.

In an embodiment (3): the BBU 103 adapts the measurements reporting procedure based on the traffic, the RRU 105 processing capabilities, and the like.

Carrier Aggregation (Two or More LAA SCells)

Described are embodiments of carrier aggregation for a plurality of LAA SCells.

As will be appreciated, a standards constraint is given in 3GPP TS 36.300 V14.3.0 (2017-06), which states "If the absence of IEEE802.11n/11ac devices sharing the carrier cannot be guaranteed on a long term basis (e.g., by level of regulation), and for this release if the maximum number of unlicensed channels that E-UTRAN can simultaneously transmit on is equal to or less than 4, the maximum frequency separation between any two carrier center frequencies on which LAA SCell transmissions are performed should be less than or equal to 62 MHz. The UE is required to support frequency separation in accordance with TS 36.133 [21]." Accordingly, combinations between 4 neighbor channels are allowed.

Figure 27:
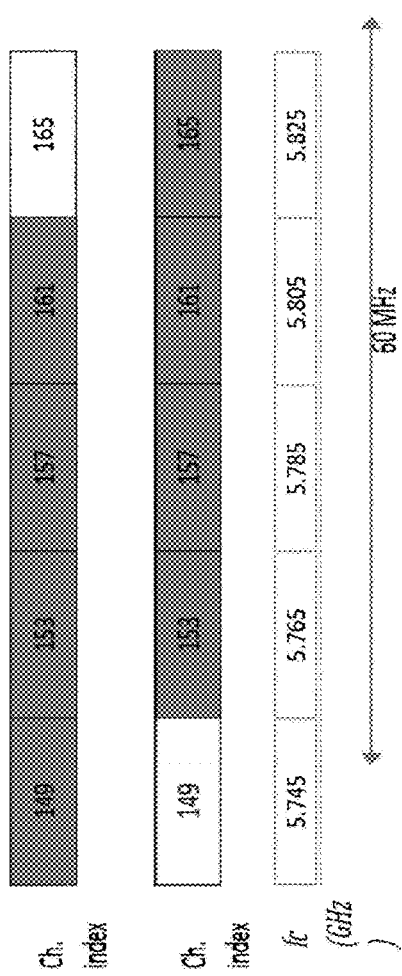
FIG. 27 is a diagram of a UNIT-3 band for LAA CA channel selection.
Figure 28:
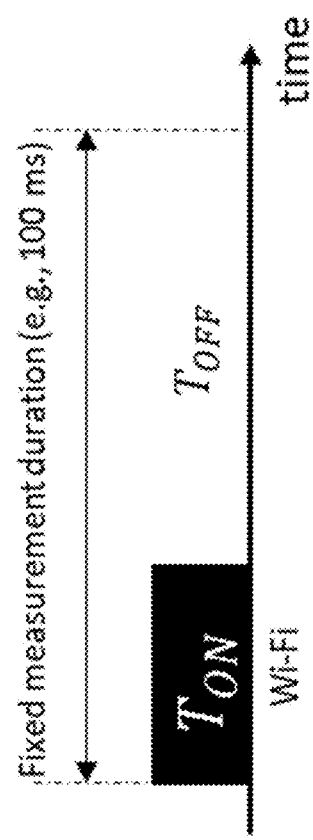
FIG. 28 is a diagram of a percentage of ON duration to the total measurement duration.

An embodiment of channel selection for LAA CA case is described using the example of the BBU/RRU are using UNII-3 band. The UNII-3 band consists of 5 channels as shown in FIG. 27.

Based on above referenced 3GPP constraint 3GPP TS 36.300, the BBU/RRU can have limited combinations to use from while doing CA for unlicensed cells. For example, based on the example shown in FIG. 27, all two-channel combinations are valid except the pair (149, 165)). For illustration, the above channels are described using channel indices 1, 2, . . . , 5.

The selected channels $f_c^*$ and $f_c^{**}$ can be calculated as follows:

$$(f_c^*, f_c^{**}) = \begin{cases} \underset{f_c \in A}{\operatorname{argmin}} \left\{ \left(\frac{R_o(f_{c1}) + R_o(f_{c2})}{2}\right), \left(\frac{R_o(f_{c1}) + R_o(f_{c3})}{2}\right), \ldots, \left(\frac{R_o(f_{c4}) + R_o(f_{c5})}{2}\right) \right\}, \\ \underset{f_c \in A}{\operatorname{argmin}} \left\{ \overline{P}_{avg}(f_C^{min}, f'^{min}_c), \overline{P}_{avg}(f_c^{min+1}, f'^{min+1}_c) \right\}, \end{cases}$$

if $(R_o(f_C^{min}, f'^{min}_c) - R_o(f_c^{min+1}, f'^{min+1}_c)) > R_o^{ThGap}$ Otherwise The BBU 103 then calculates the average occupancy ratios of all the valid channel combinations. If the difference between the two least average occupancy ratios is larger than a threshold, the BBU 103 selects the channel with the minimum occupancy ratio.

Otherwise, the BBU 103 goes to a second level of comparison, where it selects the channel with the minimum average RSSI (from the two channels with lowest occupancy ratios).

Cell Addition for LAA-Capable UEs

Described are embodiments for Cell addition for LAA-capable UEs.

One problem facing LAA-capable eNBs in C-RAN architecture or traditional RANs is the cell addition for LAA-capable UEs, including cases when both licensed and unlicensed cells are available. As described herein, licensed spectrum is more reliable than unlicensed spectrum since operators have exclusive right to use, as opposed to unlicensed spectrum, which is shared among different technologies. However, licensed spectrum is scarce and expensive, while unlicensed spectrum is abundant and free.

Described are embodiments that address cell addition in licensed and unlicensed spectrum for LAA-capable UEs. Embodiment as described herein enable the eNB (or BBU 103 in CRAN architecture) to select the best cell to add to the UE based on various metrics such as cell load, channel state information (CSI), UE capabilities, and the like. For simplicity, embodiments are described assuming the eNB is trying to add a second cell (licensed or unlicensed) to a UE that is already attached to the eNB using the primary licensed cell.

In an embodiment, the eNB considers a weighted sum of the following factors while selecting the cell to be added to the UE. In another embodiment, the process starts in a first step (i.e., cell loads) and then considers a second step (i.e., channel gains) only if the first step results in an indeterministic decision (e.g., values are close to the thresholds).

In an embodiment (1), the eNB first checks the cell loads of both licensed and unlicensed cells. One criterion determines if the licensed cell load is smaller than a predefined threshold (e.g., 70%), the eNB adds the licensed cell to the UE. The reason for this selection is that licensed cells are more reliable than unlicensed cells and should be used whenever they are available. Another criterion can determine if the difference between the licensed and unlicensed cell loads is less than a predefined threshold (i.e., both cells have comparable loads, e.g., within 20%), the eNB adds the licensed cell to the UE. Otherwise, it adds the unlicensed cell to the UE.

Next, (2) the eNB checks the channel gains of both licensed and unlicensed cells and follows similar criteria as described above (1) to select the cell to add to the UE.

If all licensed channels are loaded, then (3) the unlicensed channels can be used for new UEs demanding more throughput. At this point in time, periodic swapping between UEs in licensed and unlicensed channels is done considering UE capabilities (i.e., legacy vs. Rel. 13 capable UEs).

LBT Parameters Update

One feature of LTE in unlicensed bands (e.g., LAA) is the dependency between the LBT parameters (e.g., contention window) and the UE HARQ feedback. The RRU 105 is required to vary the contention window parameters based on the LBT Category 4 rules (e.g., double the contention window for every collision).

In C-RAN systems, the LBT parameters are sent from the BBU 103 to the RRU 105 for every MCOT. This will cause a problem for non-zero fronthaul latency systems since the BBU 103 needs to send the LBT parameters in advance to the RRU 105 before even the HARQ reaches the BBU. Multiple embodiments are configured to address this.

In an embodiment, a fake NACK message is employed for LBT parameters update. In the embodiment, the RRU 105 updates the LBT parameters (e.g., contention window) assuming that a fake NACK is received from the UE. As an example, and for priority class 3, the RRU 105 uses CW~

[0,15] for $1^{st}$ attempt, [0,31] for $2^{nd}$ attempt, and [0,63] for $>3^{rd}$ attempt until the current data stream ends.

In an embodiment, a HARQ ACK estimation message is based on number of freeze times ($N_{FT}$) during LBT. In the embodiment, the RRU 105 estimates the HARQ feedback internally based on the number of timer-freeze times during LBT. For example, if $N_{FT} \leq 1$, assume HARQ ACK, otherwise assume HARQ NACK.

In an embodiment, a fake NACK message for LBT parameters update until first HARQ ACK/NACK received. In this embodiment (assuming priority class 3), the RRU 105 uses CW~[0,15] for $1^{st}$ attempt, [0,31] for $2^{nd}$ attempt, and [0,63] for $>3^{rd}$ attempt. Once the first HARQ ACK/NACK message is received at the BBU 103, the LBT parameters are updated in a delayed fashion (due to fronthaul latency). This method is very useful for cases where high correlation in the HARQ ACK/NACK outcome between adjacent MCOTs occur.

In the following embodiments, the following sections refer to, inter alia, the XRAN-FH.CUS.0-v01.00.02 (2018-04-04) standard, the entirety of which is incorporated by reference herein.

RU/IIs-CU messages are described in Table 2.

TABLE 2

| Feature | RU/IIs-CU Message | Message Direction | Plane xRAN | Timing |
|---|---|---|---|---|
| RU Configuration | RU Capability Inquiry | Downstream | M | Initial handshake (lls-CU inquiries about the RU capabilities) |
| | RU Capability Info (SupportLAA, # LAA SCells, maximum RU buffer size in symbols (per CC), RU Processing time, supported bands, supported BW, and the like) | Upstream | M | After each RU capability inquiry message |
| | RU Config (# LAA SCells, For every LAA CC: {DMTC period, DMTC offset, initial band, total carrier-selection measurement duration, DFS measurement report period, LBT timer}) | Downstream | M | After each RU capability info. As needed, to reconfigure the RU with new parameters (e.g., measurement periods, and the like) |
| Carrier-selection and DFS | startMeasurements (carrier-selection or DFS) | Downstream | M | Lls-CU orders the RU to start measurements |
| | stopMeasurements (for DFS only) | Downstream | M | Lls-CU orders the RU to stop measurements |
| | RU measurements | Upstream | M | After the RU completes scanning all channels in the configured band |
| | cellConfig/Reconfig | Downstream | M | After the lls-CU receives the RU measurements and if a new channel needs to be configured |
| | cellReconfigACK | Upstream | M | After the RU receives the cell reconfig |

TABLE 2-continued

| Feature | RU/IIs-CU Message | Message Direction | Plane xRAN | Timing |
|---|---|---|---|---|
| LBT | LBT_DL_CONFIG.request: LBT_PDSCH_REQ | Downstream | C | Prior to each MCOT to reach the RU on/before the target SFN/SF for sensing |
| | LBT_DL_CONFIG.request: LBT_DRS_REQ | Downstream | C | Prior to each DRS to reach the RU on/before the target SFN/SF for sensing |
| | LBT_DL.indication: LBT_PDSCH_RSP | Upstream | C | After each LBT for PDSCH (success outcome or failure outcome if timer expires) |
| | LBT_DL.indication: LBT_DRS_RSP | Upstream | C | After each LBT for DRS (success outcome or failure outcome if channel is busy) |
| | bufferError (overflow or underflow) | Upstream | C | If the received data at the RU is larger than the RU buffer size or the buffer is empty at the target transmission time |

Although in the examples given below the disclosure describes that the messages can be communicated between the IIs-CU and RU via the management plane (M-plane), as will be appreciated and understood, this can also be done via the control plane (C-plane). It will also be understood that these messages can also be communicated between the RU and the DU 104 or the RU and the CU 102 or the RU and the IIs-CU 102 based on the used C-RAN split.

Message Details:

RU capability inquiry (Management-plan or M-plane): IIs-CU 102 sends a message to the RU asking it to report its capabilities RU capability info (M-plane): The RU replies to the capability inquiry message by its capabilities such as whether it supports LAA or not, the number of LAA cells it can support, the maximum buffer size per component carrier (CC), the RU processing time, the supported bands, the supported bandwidths, and the like.

RU config: The IIs-CU configures the RU with the required parameters such as the number of LAA CCs, and the like. Also, for every unlicensed CC, it configures the RU with the required parameters such as the DMTC period, the DMTC offset, the default band to operate on, default total carrier-selection measurement duration, default DFS measurement report period, LBT timer, measurements to be done (e.g., occupancy ratio, average RSSI), and the like. Note that other similar parameters could be added in the RU config message that helps configuring the RU with the default/required parameters. This can be sent initially (in the initial RU configuration) or sent during operation to reconfigure the RU.

Start measurements: The IIs-CU orders the RU to start measurements for either carrier-selection or DFS. This can be indicated by a single bit. Furthermore, the Start Measurement message includes the bands and the specific channels that need to be scanned or measured (e.g., by sending the carrier frequency in KHz or the EARFCN; Evolved-UTRA Absolute Radio Frequency No). It also includes the total measurement duration (in case of carrier-selection) or the measurement report period (in case of DF). It can also include the type of measurements to be done (e.g., occupancy ratio, average RSSI, and the like). It can also include any other information needed by the RU to do the measurements.

Stop measurements: The IIs-CU orders the RU to stop the DFS measurements.

RU measurements: The RU reports the measurements to the IIs-CU for every band configured in the Start Measurement message, and for every configured channel in the Start Measurement message. The reported measurements are done for the identified measurements types (e.g., occupancy ratio, and average RSSI, and the like).

A value="n" shall be set for RRU measurements
 bandNumber (3GPP band number) field: 8 bits
 carrierFrequencyKHz (carrier frequency in KHz) field: 32 bits
 averageRSSI (average RSSI) field: 8 bits
 occupancyRatio (occupancy ratio) field: 8 bits
 carrierFrequencyKHz (carrier frequency in KHz) field: 32 bits
 averageRSSI (average RSSI) field: 8 bits
 occupancyRatio (occupancy ratio) field: 8 bits . . . .
 A value="n" shall be set for cell reconfig 16
 carrierFrequencyKHz (carrier frequency in KHz) field: 32 bits
 A value="n" shall be set for cell reconfig ACK 18
 ack (Acknowledgment) field: 1 bit
 bandNumber (Band number)

Description: 3GPP band number.
Value range: {0000 0000b-1111 1111b}
Type: unsigned integer.
Field length: 8 bits.

carrierFrequencyKHz (Carrier frequency in KHz)

Description: Carrier frequency in KHz, where measurements are executed. Upper bound is 52.6 GHz.
Value range: {0-52600} in decimal.
Type: unsigned integer.
Field length: 16 bits.

averageRSSI (Average RSSI)

Description: Average RSSI of the channel indicated in the carrierFrequencyKHz parameter over the measurement duration.
Value range: {0000 0000b-1111 1111b} or {0 dBm to −127 dBm} in decimal.
Type: Signed integer.
Field length: 8 bits.

occupancyRatio (Occupancy ratio)

Description: Percentage of ON duration to the total measurement duration (e.g., 100 ms). Value range: {0000 0000b-0110 0100b} or {0-100} in decimal.

Type: Unsigned integer.
Field length: 8 bits.
 Occupancy ratio of carrier frequency $R_o(f_c)$:

$$R_o(f_c) = \frac{T_{ON}}{T_{ON} + T_{OFF}}$$

ack (Acknowledgment)
Description: Acknowledgment 18 for receiving the cell reconfig message 16.
Value range: {0, 1}
Type: unsigned integer.
Field length: 1 bit.
 Definitions/Assumptions:
 General Assumptions
 $D_{OW}$: Maximum one-way fronthaul latency (e.g.: up to 500 us).
 $P_{CU}$: Maximum IIs-CU processing time (reading an upstream RU c-plane message, MAC processing, sending the downstream U-plane data) (e.g.: up to 1 ms).
 $P_{RU}$: Maximum RU processing time (sending an upstream c-plane message, receiving downstream U-plane data, transmitting U-plane data OTA) (e.g.: up to 1 ms).
 $B_{RU}$: RU Buffer depth (for LAA) ceiled to an integer number of OFDM symbols in us (up to 140 symbols (e.g., MCOT). This is equivalent to the minimum amount of data that must be buffered at the RU. This parameter could be less than or equal to the actual RU buffer size sent in the LAA RU capability info.
 Each RU must satisfy the following equation:

$$B_{RU} \geq 2 \times D_{OW} + P_{CU} + P_{RU}$$

Expired symbol: symbol where the current time at the RU exceeds its target transmission time (i.e., SFN/SF) OTA.

Normal (partially-filled) SF assumption: $T_{start}$ is the start of the transmission time, which occurs at the first SF (slot) boundary the RU encounters after starting the LBT CAT 4 process. Initially known to the CU 102 (since it sends the LBT start time), it can be updated in real-time based on the LBT outcome and the communication between the IIs-CU and RU.

LBT_DLindication Threshold ($LBT_{th}$): The latest time the IIs-CU is expected to receive the LBT_DL.indication message from the RU.

$$LBT_{th} = T_{start} + (P_{RU} + D_{OW} P_{CU})$$

CU 103 Transmission time threshold ($CUT_{th}$): The time at which the IIs-CU is required to send the data to the RU to be transmitted OTA at time $T_{start}$ $$CUT_{th} = T_{start} - (P_{RU} + D_{OW} + P_{CU})$$

$$x = \begin{cases} 1ms, & \text{Normal } SF \\ 0.5ms, & \text{Partially-filled } SF \end{cases}$$

Guidelines for LAA Implementation in Cloud RAN:
The RU should have a buffer that satisfies the following equation:

$$B_{RU} \geq 2 \times D_{OW} + P_{CU} + P_{RU}$$

IIs-CU should avoid buffer overflow or underflow at the RU.

IIs-CU should only send $B_{RU}$ worth of data to the RU for every single transmission.

IIs-CU should expect for the data to be received at the RU only $P_{RU}$ before the actual OTA transmission time at the RU.

RU should avoid buffer overflow or underflow at the RU.

RU should flush its buffer (by dropping any expired symbols) as soon as any symbol becomes expired (i.e., current time is larger than the symbol's scheduled time).

RU should immediately send a success LBT indication to the IIs-CU once the channel is acquired.

On LBT CAT 4, the IIs-CU can configure the RU (via the M-plane) with the threshold on the LBT CAT 4 duration (e.g., 8 ms). Once this threshold has been exceeded, the RU sends a failure LBT indication to the IIs-CU, which in return sends back a new LBT config request. The RU can then restart the LBT CAT 4 process.

The data signal may be received at the RU before or after the LBT_PDSCH_REQ.

The IIs-CU can send a new LBT config message for every LBT indication or it can receive multiple LBT indications (with failure outcomes) and send a new LBT config message if it receives an LBT indication with success outcome. At this point, it resets the LBT phase and starts a new one with a new LBT config message. In general, the LBT indication could be sent after each sensing period (e.g., every 9 microseconds) or it can be sent only for the success outcome (i.e., after acquiring the channel).

Figure 13:
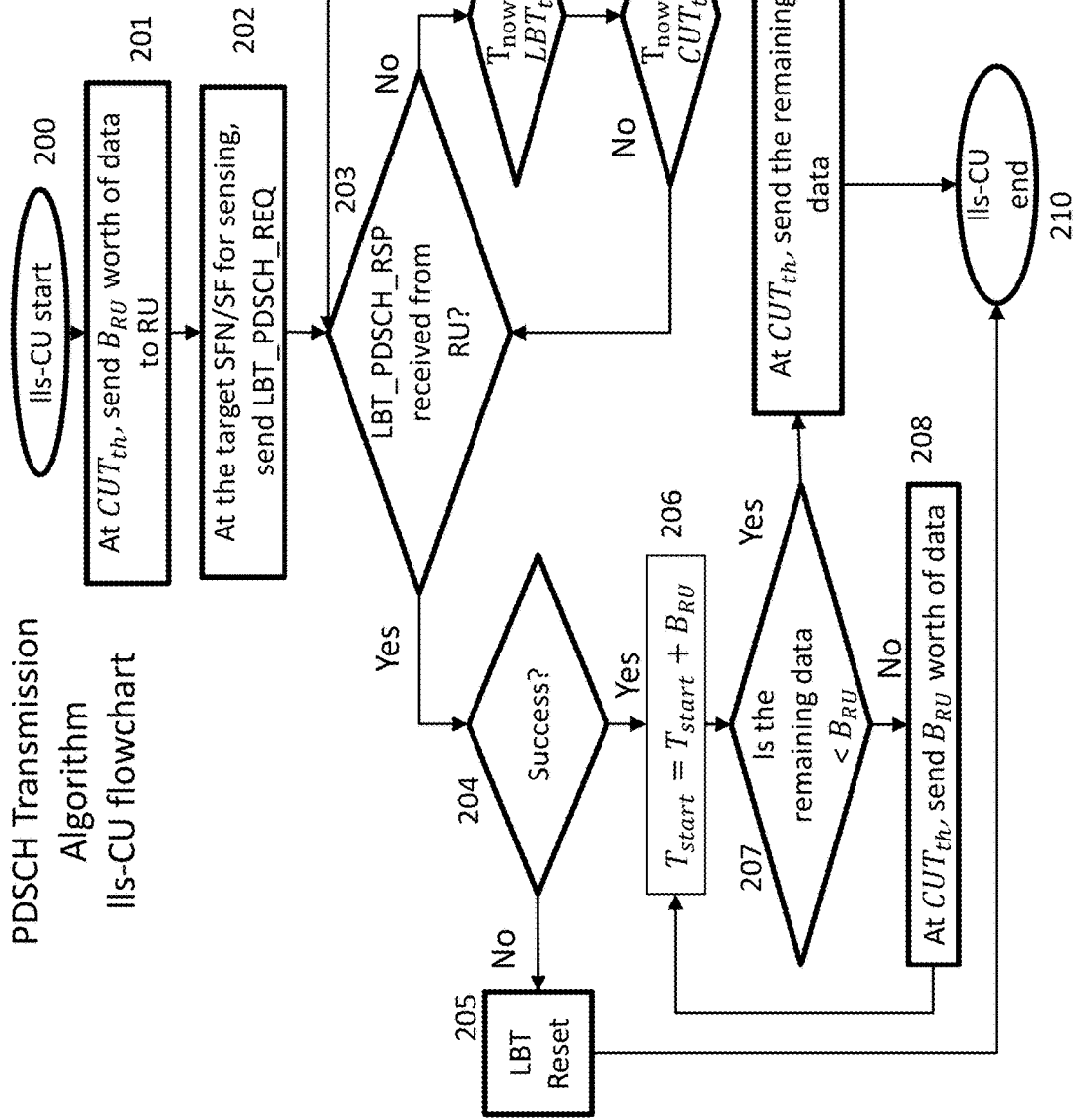
FIG. 13 is a flow chart for an embodiment of a physical downlink shared channel (PDSCH) transmission algorithm for a CU.

FIG. 13 is a flow chart illustrating a PDSCH transmission algorithm for a CU 102. After a start block 200, at block 201 the CU 102 sends $B_{RU}$ amount of data to the RRU at $CUT_{th}$. to be transmitted OTA. At block 202, for the target SFN/SF, the CU 102 sends an LBT_PDSCH_REQ request. At block 203, the CU 102 determines if the LBT_PDSCH_RSP response is received from the RU at the CU. At block 204, if the response has a successful outcome, the CU 102 determines if the LBT_PDSCH_RSP response is successful. If not (e.g., LBT timer is expired), at block 205 the LBT process is reset, and at block 210 the CU 102 ends the transmission. At block 204, if the LBT_PDSCH_RSP response from the RU is successful (success), at block 206 the CU 102 increments $T_{start}$ by buffer depth $T_{start}=T_{start}+B_{RU}$. At block 207, the CU 102 also determines if the remaining data is less than the buffer depth of the RU $B_{RU}$. If so, at block 209 the CU 102 sends the remaining data to the RU at $CUT_{th}$. If the remaining data is not less than the buffer depth of the RU $B_{RU}$, at block 208 the CU 102 only sends $B_{RU}$ worth of data to the RU.

If at block 203 the CU 102 determines the LBT_PDSCH_RSP response has not been received from the RU, at block 211 the CU 102 determines if the current time is the latest time the IIs-CU is expected to receive the LBT_DL.indication message from the RU $T_{Now}=LBT_{TH}$. If so, at block 212, the IIs-CU 102 updates the time where data is supposed to be transmitted OTA $T_{start}=T_{start}+\lceil B_{RU} \rceil$, and returns to block 203 to await the LBT_PDSCH_RSP response and continue the process from there ($\lceil a \rceil$: is the ceiling of number "a" to the nearest x, where x is 1 ms for normal SF and 0.5 ms for partially-filled SF). If not, at block 213 the CU 102 determines if the current time is equal to the CU 102 transmission time threshold $CUT_{th}$. If so, at block 214 the CU sends $B_{RU}$ worth of data. If not, the CU 102 then returns to determining if the LBT_PDSCH_RSP response has been received to block 203 and continues the process from there.

Figure 14A:
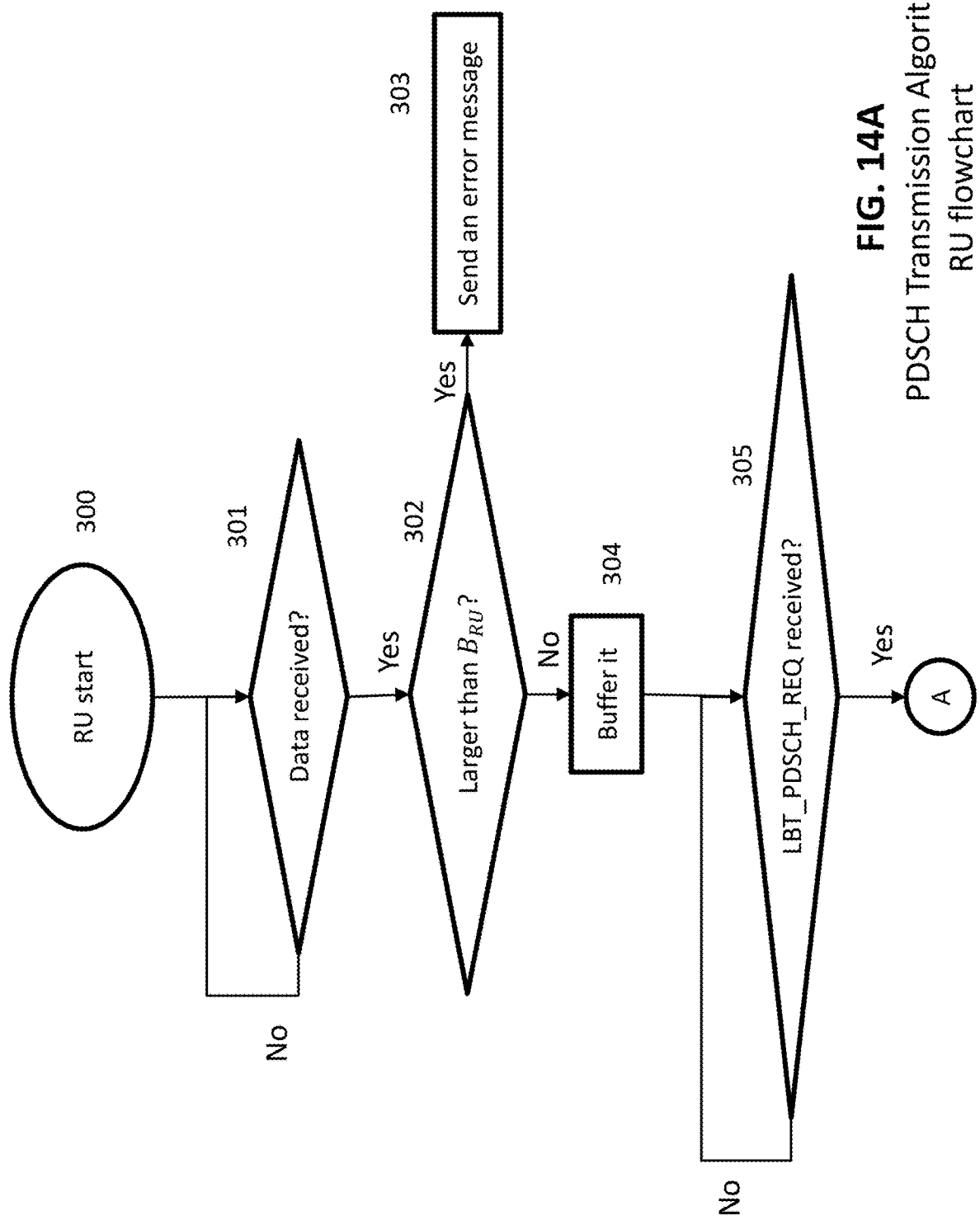
FIGS. 14A-14B are flow charts for an embodiment of a PDSCH transmission algorithm for an RRU.
Figure 14B:
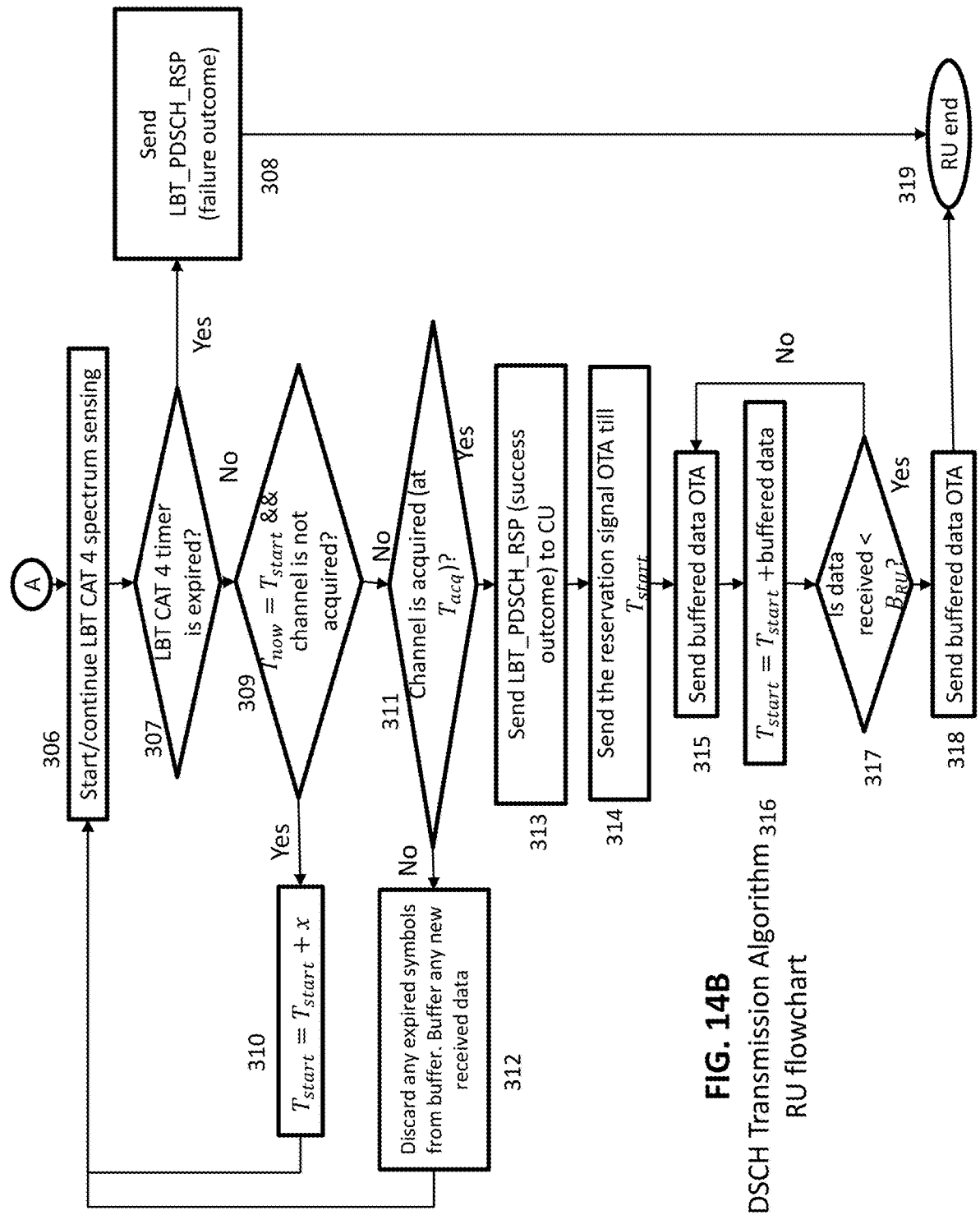

FIGS. 14A-14B are a flow chart for a PDSCH transmission algorithm for a RU. After a start block 300, at block 301 the RU determines if data is received. If not, the RU continues checking to determine if data is received. When the RU determines data is received, at block 302 the RU determines if the amount of data is larger than the RU's buffer $B_{RU}$. If so, at block 303 the RU send an error message to the CU. If the amount of data does not exceed the RU's buffer, at block 304 the RU buffers the data.

At block 305, the RU determines if it has received an LBT_PDSCH_REQ request from the CU. At block 306, if the request is confirmed to be received, the RU starts LBT CAT 4 spectrum sensing. At block 307, the RU determines if the LBT CAT 4 timer has expired. If so, at block 308 the RU sends a failure message to the CU (LBT_PDSCH_RSP: failure outcome) and terminates the process at block 319. If at block 307 the LBT CAT timer has not expired, at block 309 the RU determines if the current time is the start time and if the channel is not acquired. If so, at block 310 the RU increments the Tstart by x, $T_{start}=T_{start}+x$ and returns to block 306 to continue the LBT CAT 4 spectrum sensing. If not, at block 311 the RU determines if a channel is acquired at Tacq. If the channel is not acquired, at block 312 the RU discards any expired symbols from the buffer and buffers any new received data. The RU then returns to block 306 to continue the LBT CAT 4 spectrum sensing.

If the channel is acquired at block 311, at block 313 the RU sends a success message to the CU (LBT_PDCH_RSP: success outcome). At block 314, the RU sends a reservation signal OTA until $T_{START}$. At block 315, the RU sends the buffered data OTA. At block 316, the RU updates Tstart as $T_{start}=T_{start}+B_{RU}$. At block 317, the RU also determines if the received data is less than the buffer depth of the RU $B_{RU}$. If so, at block 318 the RU continues to send the buffered data OTA. The process ends at block 319. If the remaining data is not less than the buffer depth of the RU $B_{RU}$, the RU returns to block 315 to send buffered data OTA and performs the data reception check again at block 317.

Figure 15:
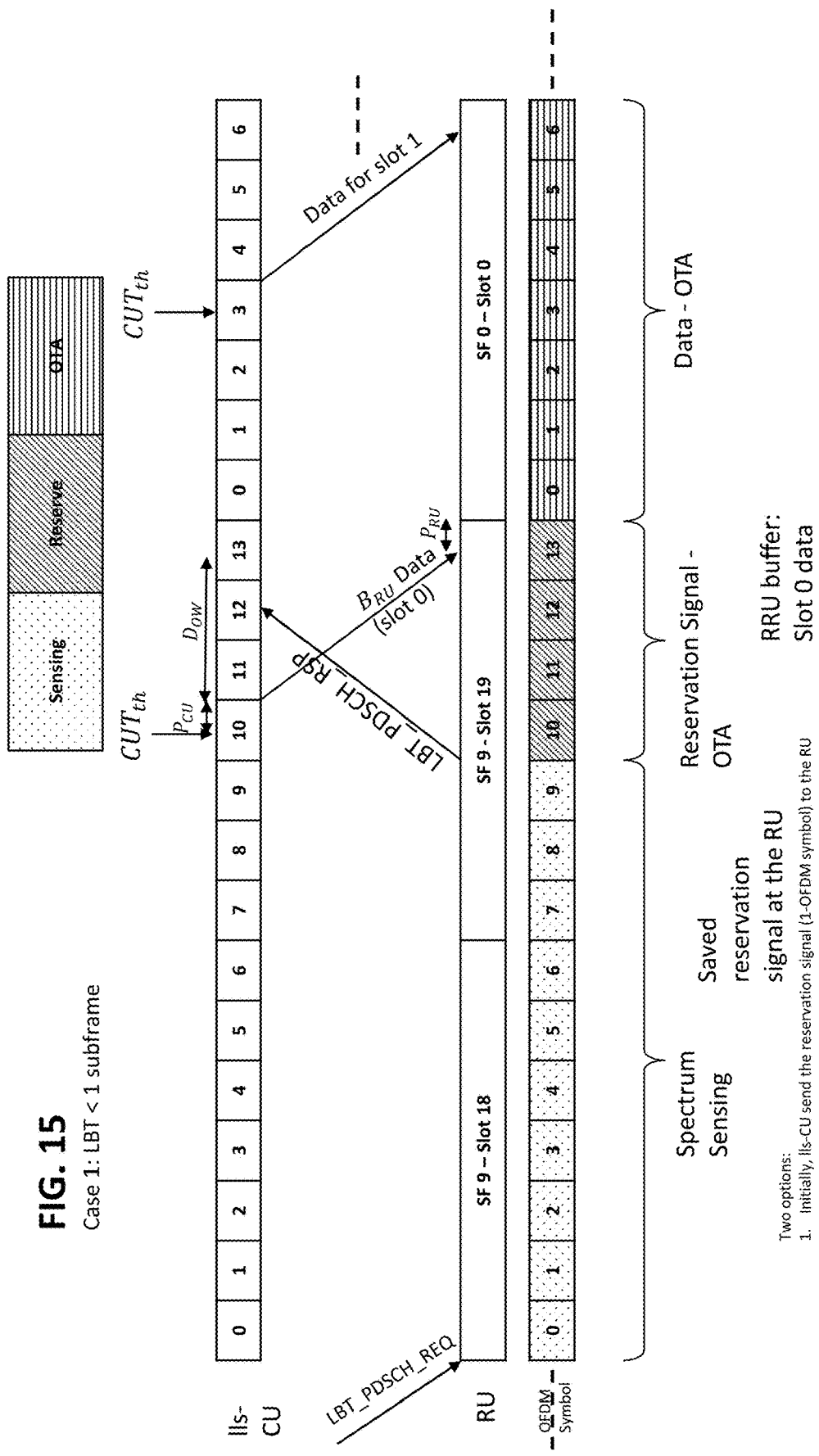
FIGS. 15-18 show examples of Fronthaul Normal subframe (SF) support.

FIG. 15 is a shading code for an RU spectrum sensing (dots) reservation signal (diagonal lines) and sending data OTA (horizontal lines) used in FIGS. 15-19, 22 and 24.

FIGS. 15-18 are an embodiment and examples to address Fronthaul Normal SF support as described in FIGS. 13-15B above. Assumptions for the following examples are:

$2 \times D_{OW}$: 5 symbols duration $P_{CU}$: 1 symbol duration (divided between UL and DL processing)

$P_{RU}$: 1 symbol duration (divided between UL and DL processing)

$B_{RU}$: 1 slot worth of data

Normal CP

As will be appreciated parameters are not required to be integer number of OFDM symbols. This is assumed only for simplicity.

Embodiment 1

Example 1

FIG. 15 is an embodiment where the LBT is less than one subframe.

Example 2

Figure 16:
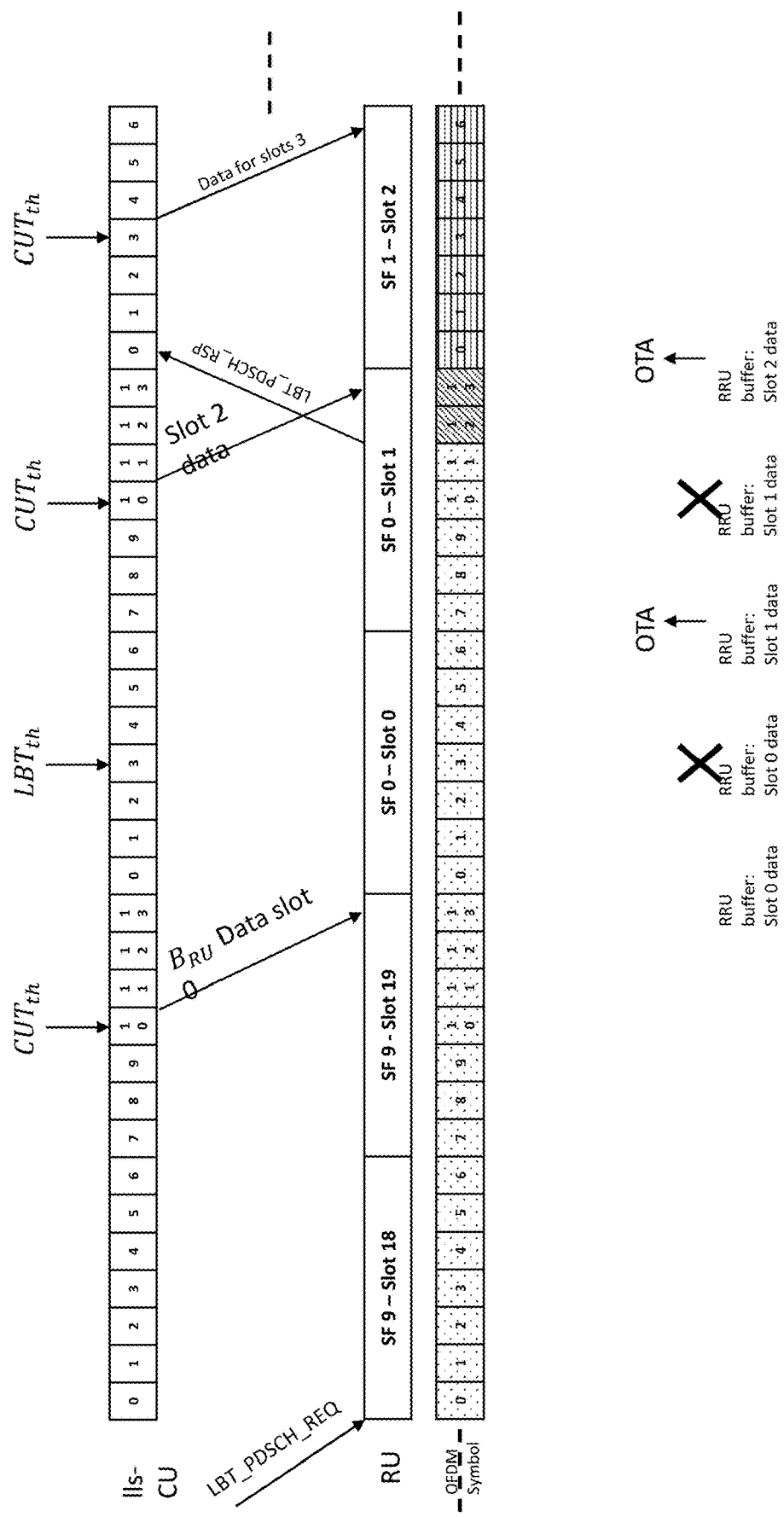

FIG. 16 is an embodiment where the LBT is greater than one subframe.

Example 3

Figure 17:
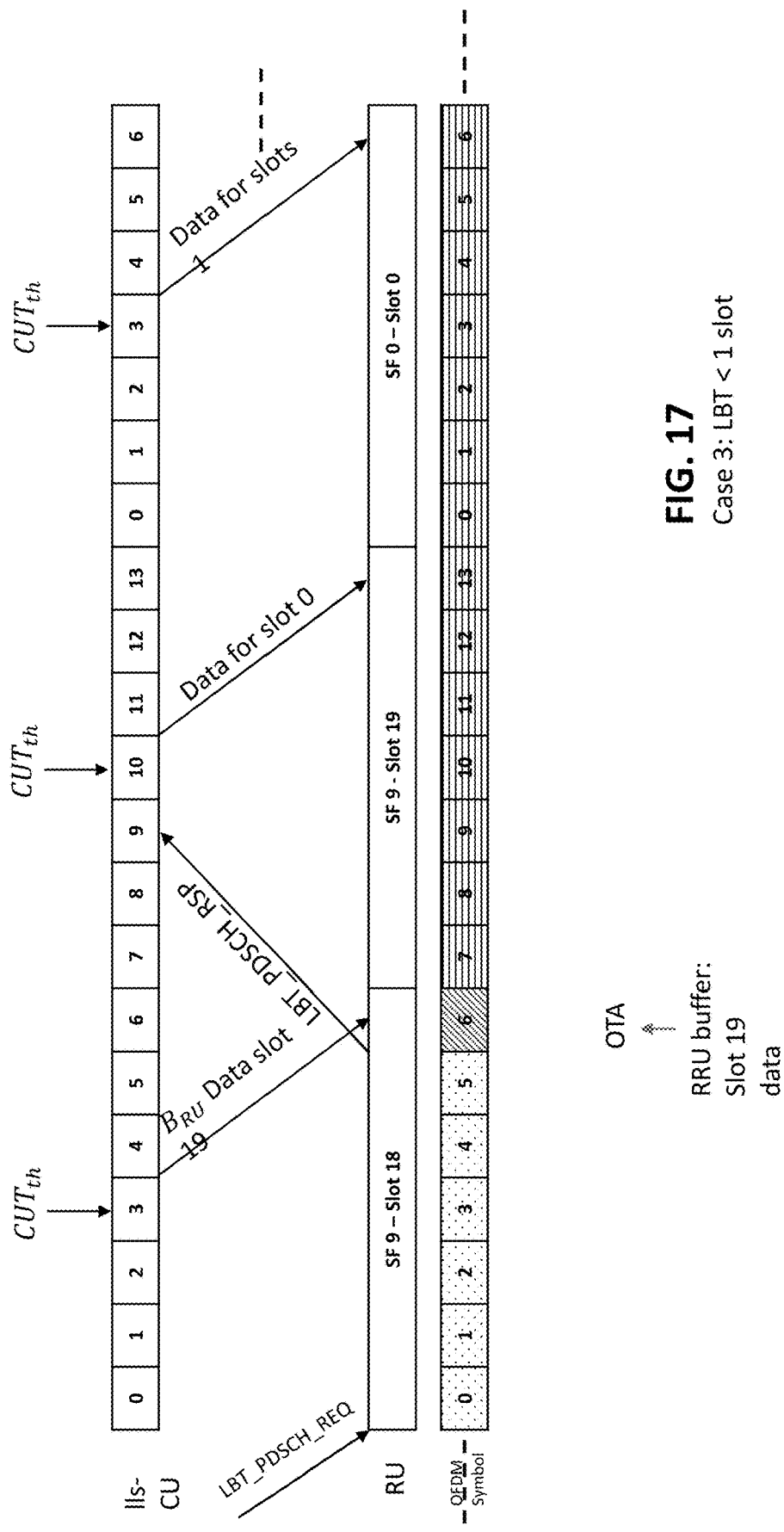

FIG. 17 is an embodiment where the LBT is less than one slot.

Example 4

Figure 18:
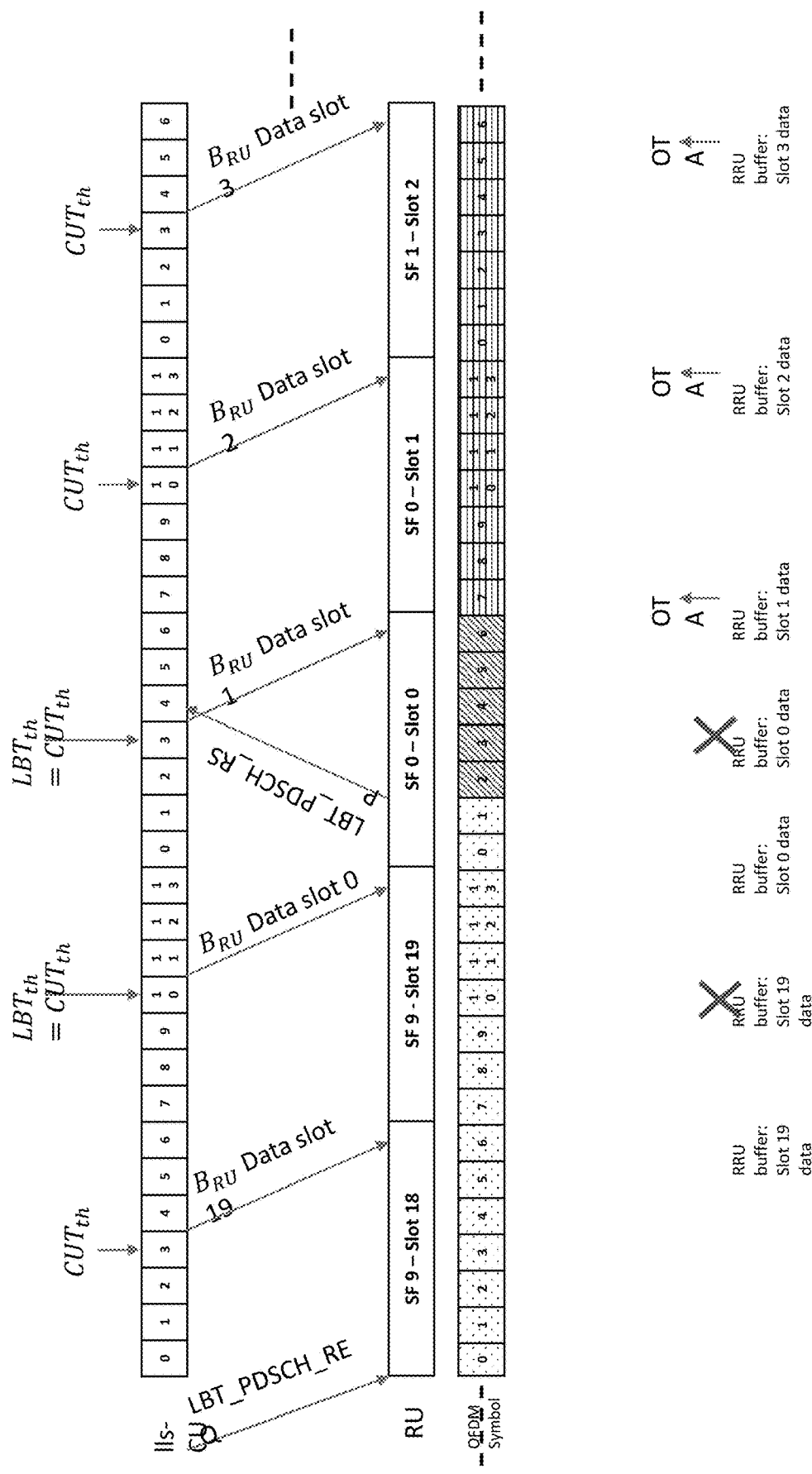

FIG. 18 is an embodiment where the LBT is greater than one slot.

Embodiment 2

Figure 19:
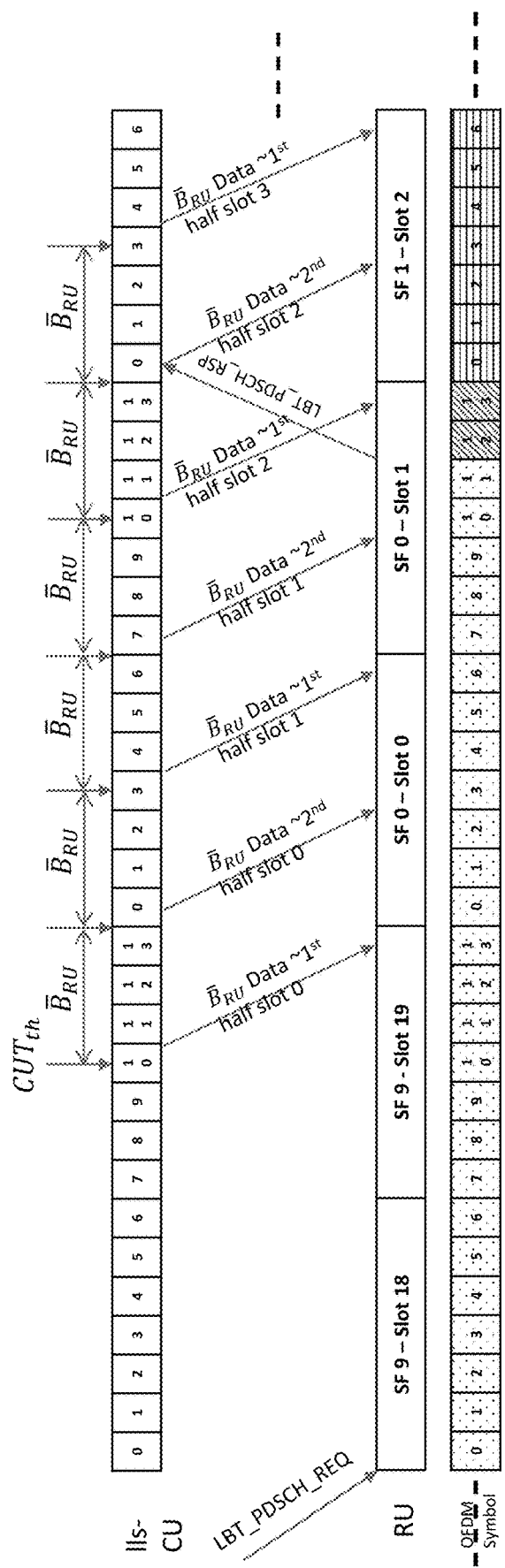
FIG. 19 shows examples for PDSCH transmission support.

FIG. 19 is another embodiment and examples for PDSCH transmission (normal and partially-filled SFs options) support as described in FIGS. 13-14B above. Assumptions for the following examples are:

Constraint: $\overline{B}_{RU} \geq D_{OW} + P_{CU} + P_{RU}$

CU Transmission time threshold ($CUT_{th}$): The time at which the IIs-CU is required to send the data to the RU to be transmitted OTA at time $T_{start}$ $$CUT_{th} = T_{start} - (P_{RU} + D_{OW} + P_{CU})$$

One variant of the first embodiment is to let the IIs-CU stream the data continuously to the RU in chunks of $\overline{B}_{RU}$ starting at time $CUT_{th}$ and with period $\overline{B}_{RU}$ until it gets the LBT_PDSCH_RSP with a success outcome.

At this point, the IIs-CU calculates the number of remaining symbols that need to be transmitted till the end of MCOT.

The IIs-CU continues the streaming of the $\overline{B}_{RU}$ chunks of data with period $\overline{B}_{RU}$ until the end of the MCOT.

The RU follows the same algorithm for embodiment 1. However, $B_{RU}$ needs to be replaced with $\overline{B}_{RU}$.

An exemplary advantage of embodiment 2 is that it has a smaller RU buffer constraint than embodiment 1.

Example 4

FIG. 19 shows an embodiment where the LBT is greater than one subframe.

DRS Transmission

For DRS transmission, it is noted that:

PSS/SSS being part of a DRS can occur outside subframe 0 and 5.

CRS/CSI-RS/PSS/SSS do not vary with subframe # but are kept unchanged across subframes 0-4 (call it DRS_v1) and 5-9 (DRS_v2).

DRS transmission (from CU to RU) can be done once at the beginning (e.g., initial configuration or at the first DRS transmission instant), and optionally can be sent every DRS period (from the CU to the RU).

Assumption: DRS OTA transmission starts at the SF boundaries. It will be understood that proposed method can be adapted and applied to allow DRS transmission start time at any OFDM symbol. The same concept can be used for both cases.

The DRS signal may be received before or after the LBT_DRS_REQ.

$$DRS_{th,1} = SF0 - (P_{RU} + D_{OW} + P_{CU})$$

$$DRS_{th,2} = SF5 - (P_{RU} + D_{OW} + P_{CU})$$

SF0: The start of SF 0

SF5: The start of SF 5

At $DRS_{th,1}$, IIs-CU sends DRS_v1 (i.e., to be transmitted within SFs 0-4).

At $DRS_{th,2}$, IIs-CU sends DRS_v2 (i.e., to be transmitted within SFs 5-9).

Optional: The IIs-CU can send a new LBT_DRS_REQ (with the new sensing parameters) for every failure outcome it receives.

Optional: The RU can generate the reference signals (e.g., DRS) locally and keep them in the buffer.

Optional: The IIs-CU can send the reference signals to the RU once at the initial configuration. The RU can keep them in buffers and use them accordingly.

LBT indication with failure outcome could be sent for every sensing period.

DRS Transmission Algorithm

Figure 20:
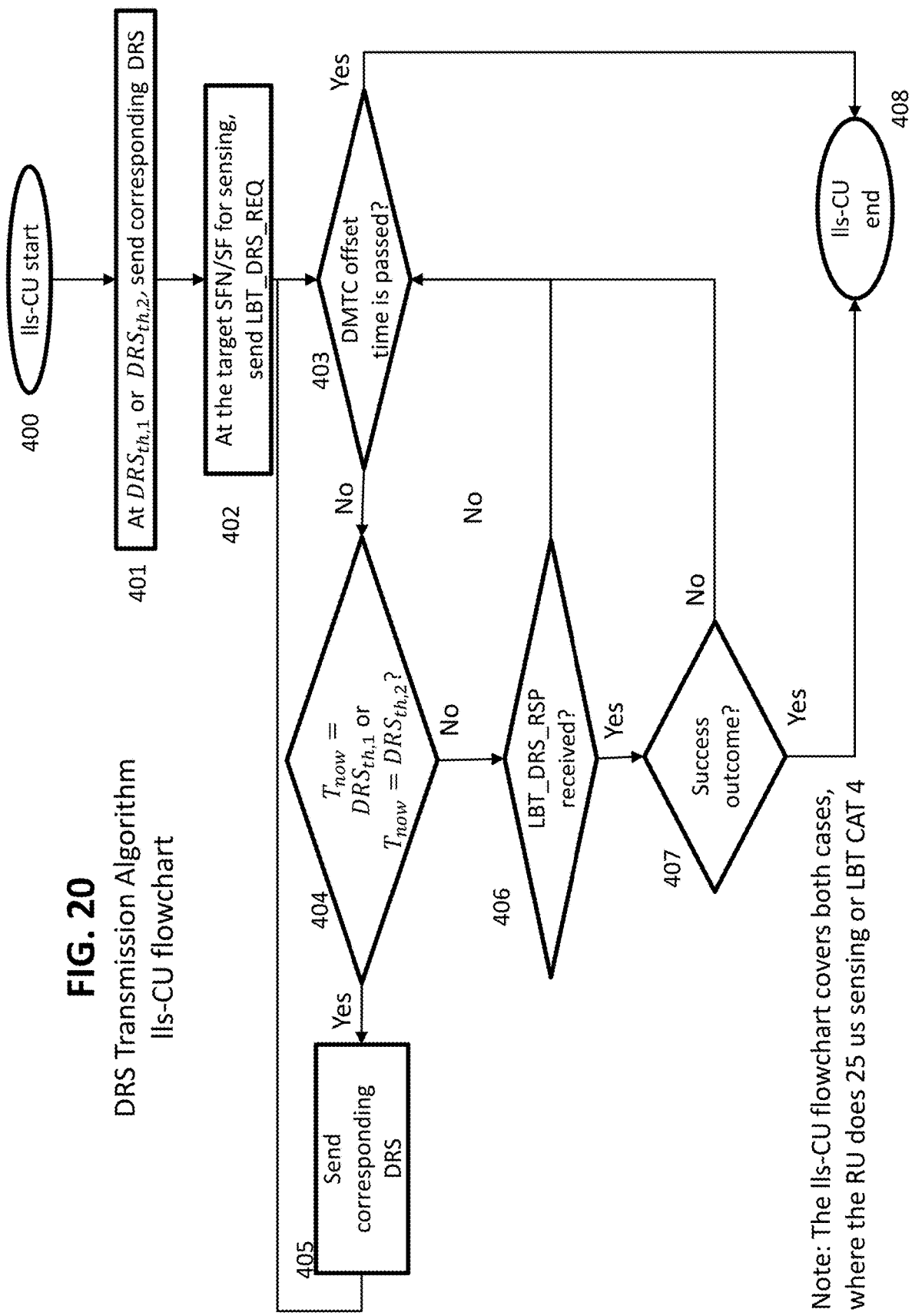
FIG. 20 is a flow chart for an embodiment of a Discovery Reference Signal (DRS) transmission algorithm for a CU.

FIG. 20 is a flow chart illustrating a DRS transmission algorithm for a CU. After a start block 400, at block 401 the CU sends a corresponding DRS at $DRS_{th,1}$ or $DRS_{th,2}$. At block 402, at the target SFN/SF for sensing, the CU sends a LBT_DRS_REQ request. At block 403, the CU determines if the DMTC offset time has passed (this can be done automatically at the RU and IIs-CU or the IIs-CU can send an indication message to the RU to stop the DRS transmission procedure). If so, at block 408 the CU terminates the process. If not, at block 404 the system determines if the current time is $DRS_{th,1}$ or $DRS_{th,2}$ ($T_{now} = DRS_{th,1}$ or $T_{now} = DRS_{th,2}$?). If so, at block 405 the CU sends the corresponding DRS. If not, at block 406 the CU determines if the RU has received the LBT_DRS_RSP response. If not, the CU returns to block 403 to determine if the DMTC offset time has passed and continues the process. If the RU has received, the request, at block 407 the CU determines if the outcome is successful, and if so, ends the process at block 408. If not, the CU returns to block 403 to determine if the DMTC offset time has passed to continue the process.

As will be appreciated, the DRS transmission algorithm for the IIs-CU is the same for an RU configured for and doing 25 µs sensing as shown below with respect to FIG. 21 or for an RU configured for and doing LBT CAT 4 sensing as shown below with respect to FIG. 22.

Figure 21:
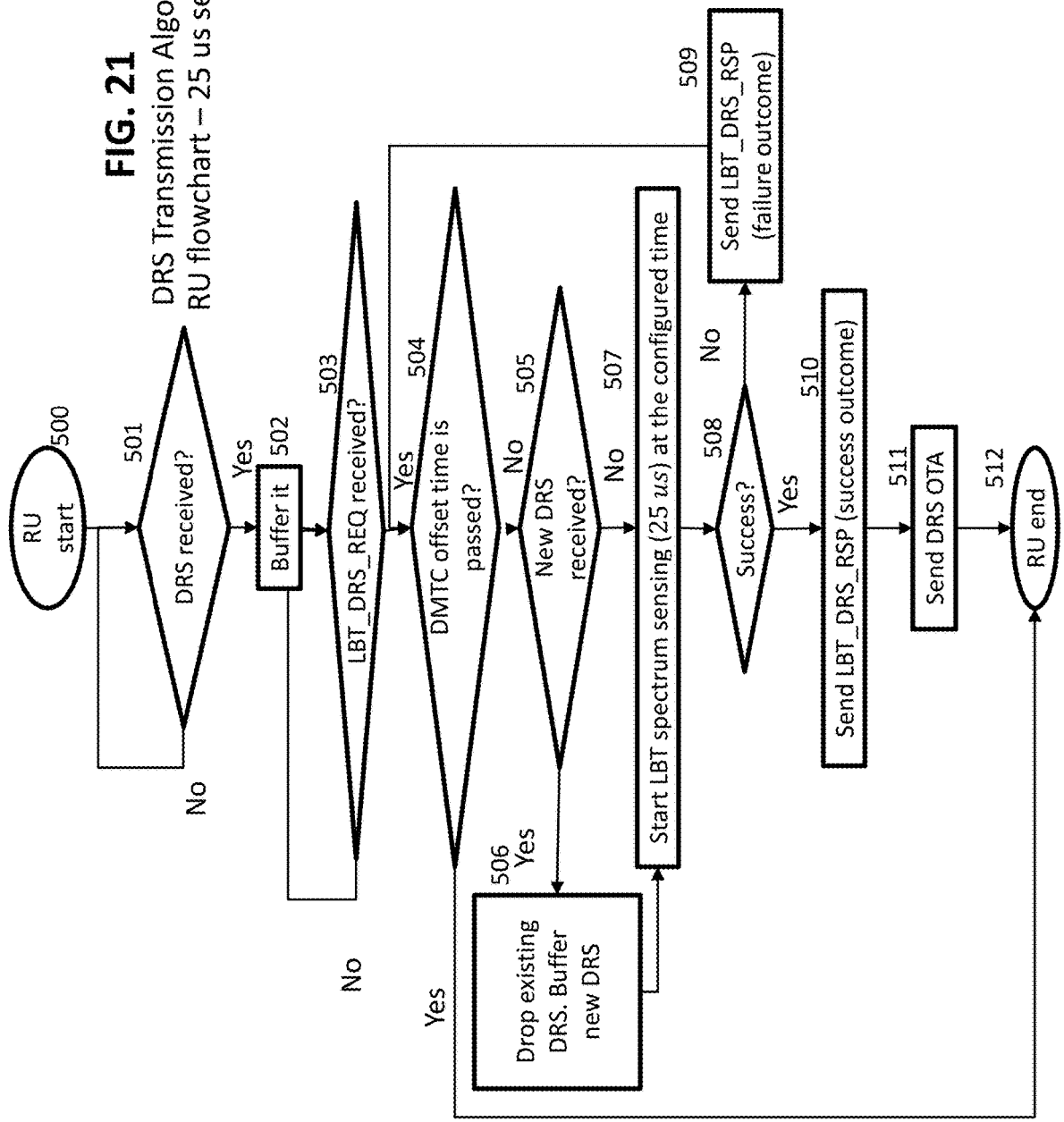
FIG. 21 is a flow chart for an embodiment of a DRS transmission algorithm for an RRU.

FIG. 21 is a flow chart for an embodiment of a DRS transmission algorithm for a RU doing 25 µs sensing. After a start block 500, at block 501 the RU determines if a DRS is received, and if so, at block 502 buffers the DRS. If the DRS is not received, the RU continues to listen for the DRS.

After the DRS is buffered, at block 503, the RU determines if it has received an LBT_DRS_REQ request from the CU. If so, at block 504, the RU determines if the DMTC offset time has passed. If so, at block 512 the RU terminates the process. If not, at block 505 the RU determines if a new DRS has been received. If not, at block 507, the RU starts LBT spectrum sensing (25 µs) at a configured time. If a new DRS has been received, at block 506, the RU drops existing DRS buffered at block 502 and buffers the new DRS. Then, at block 507, the RU starts LBT spectrum sensing (25 µs) at the configured time.

At block 508, the RU determines if the LBT spectrum sensing is successful. If not, at block 509, the RU sends a failure message (LBT_DRS_RSP: failure outcome), and the RU returns to block 504 to determine if the DMTC offset time has passed and continues the process. If so, at block 510, the RU sends a success message (LBT_DRS_RSP: success outcome) and, at block 511, the RU send the DRS over the air to the target device(s). Block 512 ends the process.

Example 5

Figure 22:
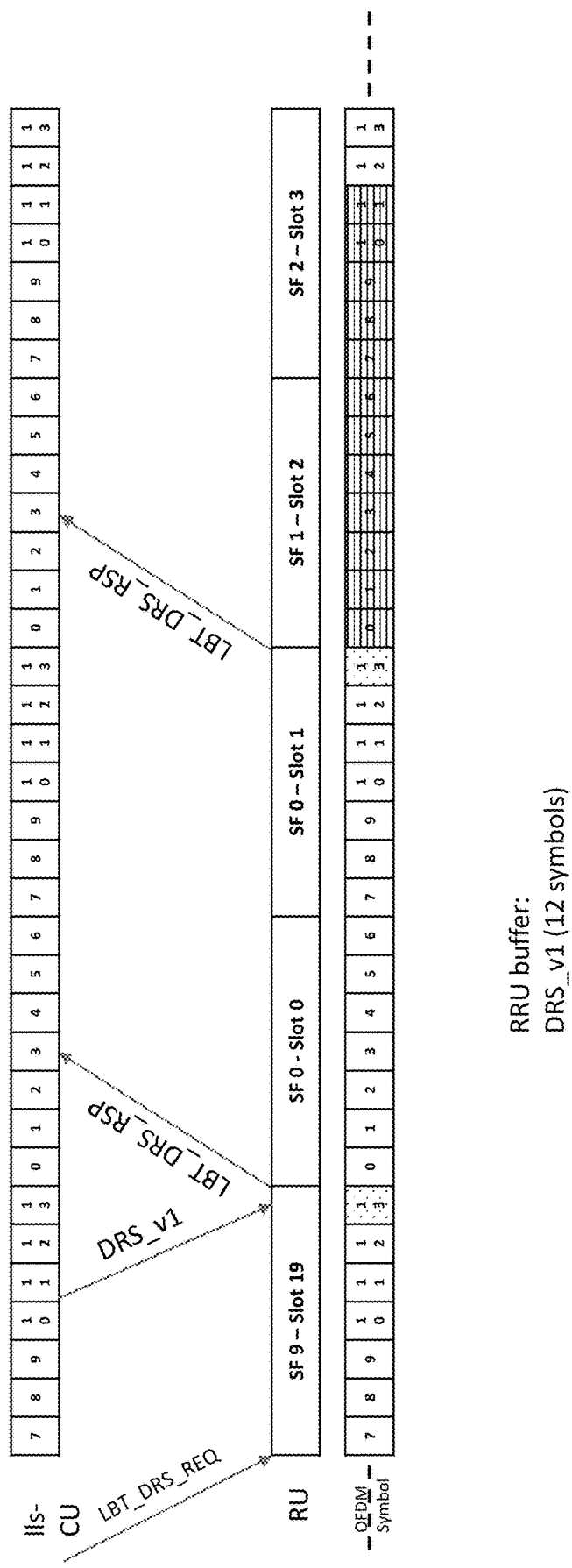
FIG. 22 shows an example of DRS transmission for LBT.

FIG. 22 is an example of DRS—25 µs LBT as shown with respect to the flow charts of FIGS. 20-21.

Figure 23:
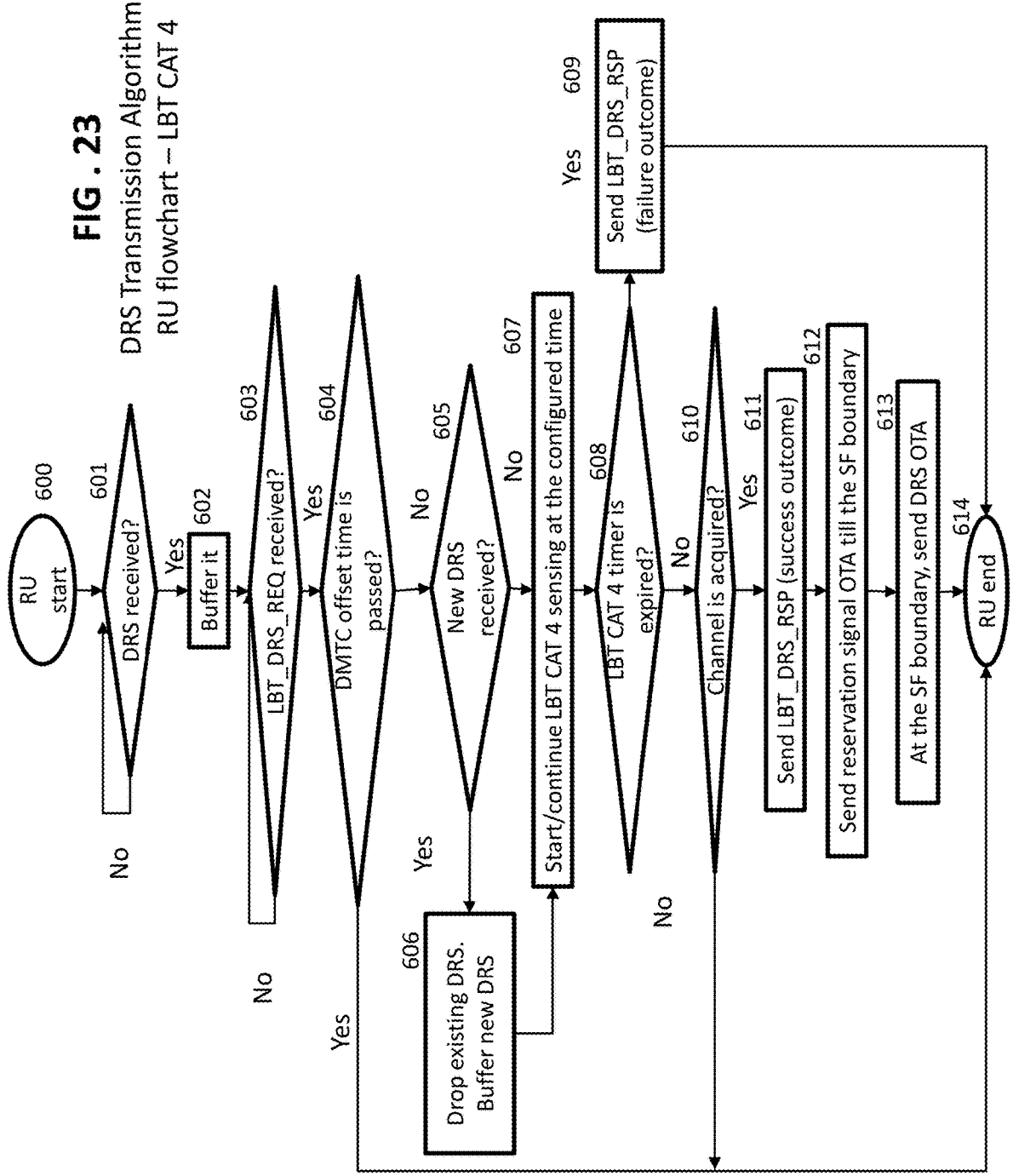
FIG. 23 is a flow chart for an embodiment of a DRS transmission algorithm fora RU.

FIG. 23 is a flow chart illustrating a DRS transmission algorithm for a RU. After a start block 600, at block 601, the RU determines if a DRS is received, and if so, at block 602 buffers the DRS. If the DRS is not received, the RU continues to listen for the DRS. If not, at block 603, the RU determines if a LBT_DRS_REQ request been received. If not, the RU continues to listen and determine if the request has been received. If so, at block 605, the RU determines if the DMTC offset time has passed. If so, at block 614, the RU terminates the process. If not, at block 605, the RU determines if a new DRS has been received. If not, at block 607, the RU starts LBT CAT sensing at a configured time. If a new DRS has been received, at block 606, the RU drops existing DRS buffered at block 502 and buffers the new DRS. Then, at block 607, the RU starts LBT CAT sensing at the configured time.

At block 608, the RU determines if the LBT CAT4 timer is expired. If so, at block 609, the RU sends a failure message (LBT_DRS_RSP: failure outcome) and, at block 614, ends the process. If not, at block 610, the RU determines if a channel is acquired. If not, the RU returns to block 604 to determine if the DMTC offset time has passed and continues the process from there.

If a channel is acquired at block 610, at block 611, the RU sends a success message (LBT_DRS_RSP: success outcome) and, at block 612, the RU sends the reservation signal OTA to the target device until the SF boundary. At block 613, at the SF boundary, the RU sends the DRS OTA. Block 614 ends the process.

Example 6

Figure 24:
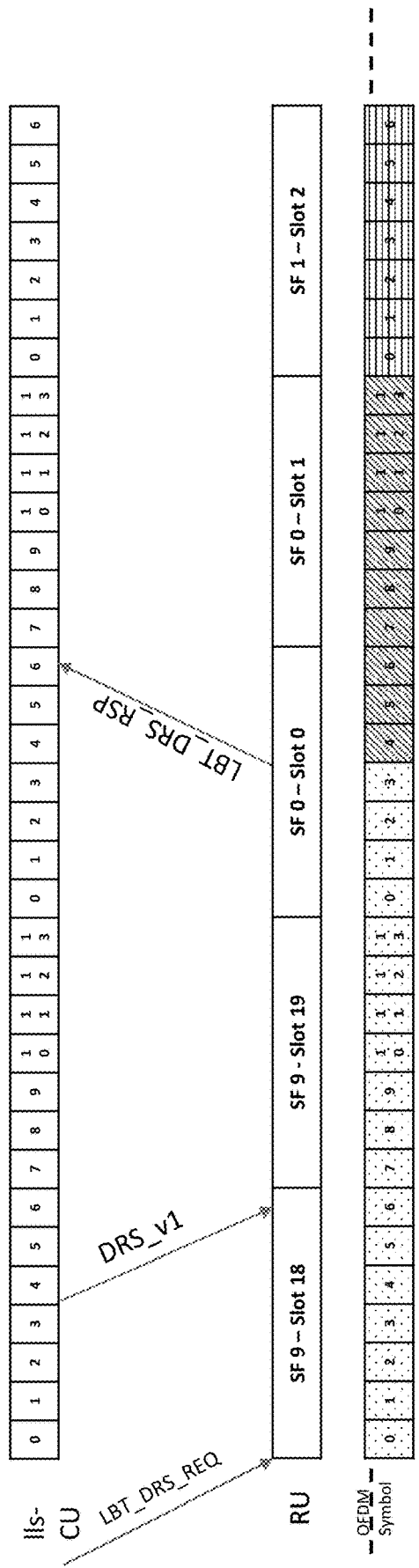
FIG. 24 is an example of DRS transmission for LBT.

FIG. 24 is an example of DRS—LBT CAT 4 in accord with the method of FIGS. 20 and 23.

Multi-Cell LAA: assigning LAA and non-LAA capable UEs to a cloud RAN solution that supports carrier aggregation among multiple licensed and unlicensed component carriers (CCs).

Figure 25:
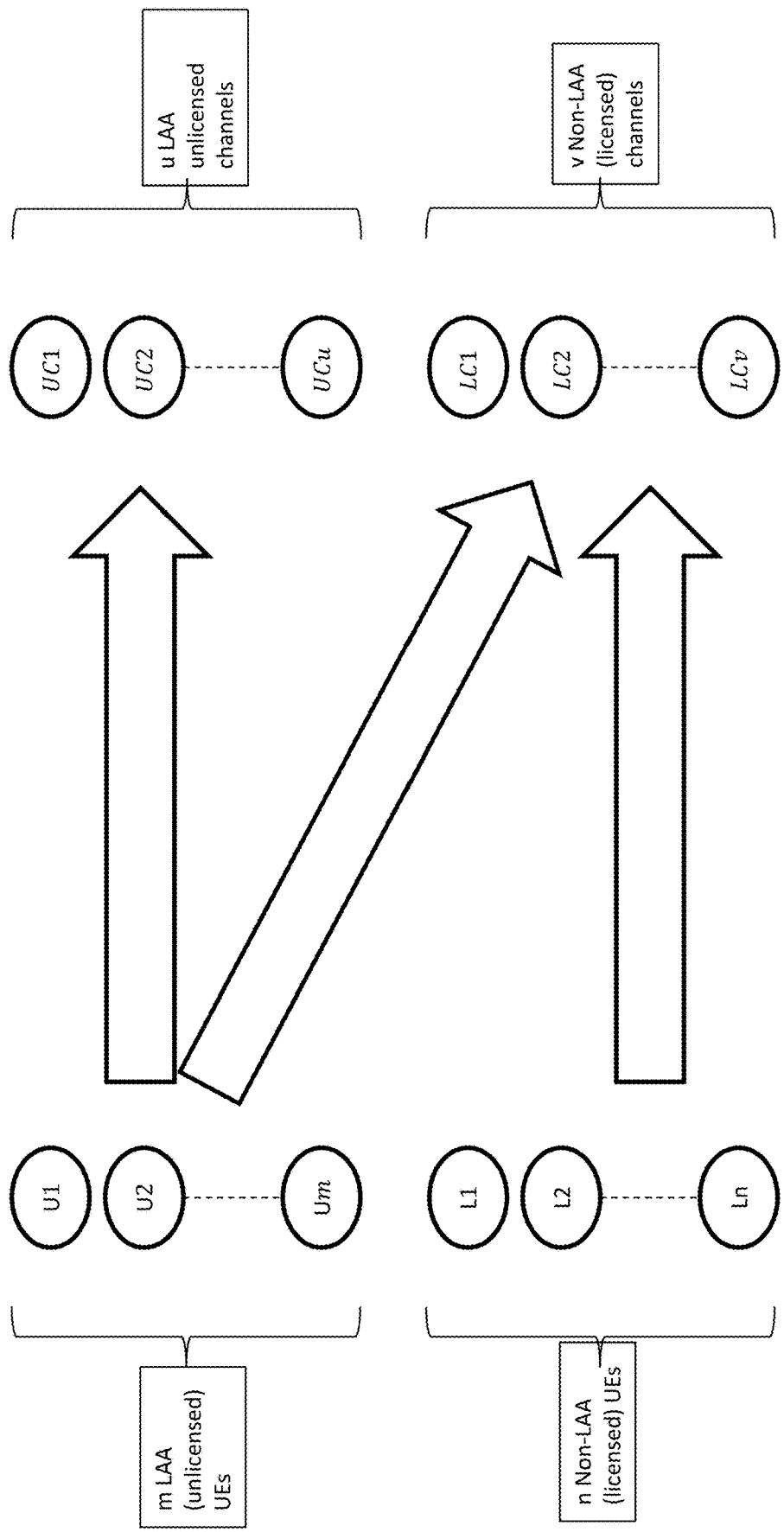
FIG. 25 is an embodiment for assigning LAA and non-LAA capable user equipment (UE) to licensed and unlicensed component carriers (CCs).

FIG. 25 is an embodiment for assigning LAA and non-LAA capable UEs to licensed and unlicensed component carriers (CCs).

Tables 3-5 show a summary of UNII bands:

TABLE 3

| E-UTRA Operation Band | UNII Band | UL/DL Frequency Range (GHz) | Number of 20 MHz Channels | DFS/TPC |
|---|---|---|---|---|
| 46a | UNII-1 | 5.15-5.25 | 4 | Not required |
| 46b | UNII-2A | 5.25-5.35 | 4 | Required for Radar |
| 46c | UNII-2C | 5.47-5.725 | 12 | Required for Radar |
| 46d | UNII-3 | 5.725-5.85 | 5 | Not required |
|  | UNII-4 | 5.85-5.925 | N/A (used mainly for DSRC/ITS) | Not required |

TABLE 4

| UNII-1 channel number | Carrier frequency (MHz) |
|---|---|
| 36 | 5180 |
| 40 | 5200 |
| 44 | 5220 |
| 48 | 5240 |

TABLE 5

| UNII-3 channel number | Carrier frequency (MHz) |
|---|---|
| 149 | 5745 |
| 153 | 5765 |
| 157 | 5785 |
| 161 | 5805 |
| 165 | 5825 |

3GPP TS 36.300 V15.1.0 (2018-04-03) describes a specification constraint when aggregating multiple LAA cells:

"If the absence of IEEE802.11n/11ac devices sharing the carrier cannot be guaranteed on a long-term basis (e.g., by level of regulation). For this release if the maximum number of unlicensed channels that E-UTRAN can simultaneously transmit on is equal to or less than 4, the maximum frequency separation between any two carrier center frequencies on which LAA SCell transmissions are performed should be less than or equal to 62 MHz. The UE is required to support frequency separation in accordance with TS 36.133 [21]."

For purposes of illustration, some assumptions are made about the number of LAA cells, the supported bands, and the like in the following description. Ordinarily skilled artisans will understand that the following methods can be generalized do not require these assumptions. However, these assumptions are only given for illustration (and to give examples) and not to restrict the exemplary methods described.

Band combinations for 3 and 4 LAA cells are shown below (as an example). For simplicity and illustration, only bands that do not require coexistence with Radar (i.e., UNII-1 and UNII-3) are described, shown below in Table 6.

TABLE 6

| 3 unlicensed LAA cells | 4 unlicensed LAA cells |
|---|---|
| 3 UNII-1 | 4 UNII-1 |
| 2 UNII-1 + 1 UNII-2A | 3 UNII-1 + 1 UNII-2A |
| 1 UNII-1 + 2 UNII-2A | 2 UNII-1 + 2 UNII-2A |
| 3 UNII-2A | 1 UNII-1 + 3 UNII-2A |
| 3 UNII-2C | 4 UNII-2A |
| 2 UNII-2C + 1 UNII-3 | 4 UNII-2C |
| 1 UNII-2C + 2 UNII-3 | 3 UNII-2C + 1 UNII-3 |
| 3 UNII-3 | 2 UNII-2C + 2 UNII-3 |
|  | 1 UNII-2C + 3 UNII-3 |
|  | 4 UNII-3 |

In the following algorithm, it is assumed that the CA combination between licensed and unlicensed bands are supported by the UE based on 3GPP TS 36.104 V15.2.0 (2018-04-06). The IIs-CU can filter the supported bands by the RU to the CA combinations supported by 3GPP.

Algorithm 1: IIs-CU/RU handshake algorithm for initial channel selection (M-plane).

During initial configurations, RU will inform the IIs-CU about its capabilities. This includes whether it supports LAA or not, maximum number of LAA CCs it can support, RU buffer size per CC, the supported bands at the RU (e.g., 46a, 46d), supported bandwidths, and the like.

Based on the supported bands, the IIs-CU will order the RU to start measurements for these bands (e.g., to scan band 46a (UNII-1) and band 46d (only UNII-3 band).

In the "startMeasurements" message, the IIs-CU will inform the RU about the bands numbers, channels carrier frequency, total measurement duration.

The RU will calculate the average RSSI and the occupancy ratio for each channel and send the measurements back to the IIs-CU.

The IIs-CU lists all the "valid" available unlicensed band combinations based on the RU capabilities (e.g., the IIs-CU can either selects UNII-1 or UNII-3 band to operate on if only these two bands are supported i.e., 3 or 4 CCs in UNII-1 or 3 or 4 CCs in UNII-3). As an example, $$\binom{n}{k} = \frac{n!}{(n-k)!\,k!}$$

for n=4 channels (UNII-1 band only) and $$k = 3CCs \Rightarrow \binom{4}{3} = 4$$

combinations. The RU needs to select ONLY the valid combinations.

For another example, for n=5 channels and k=3 CC, there are 10 combinations. 3 of them are not valid:

149/153/157
149/153/161
149/153/165** Not valid
149/157/161
149/157/165** Not valid
149/161/165** Not valid
153/157/161
153/157/165
153/161/165
157/161/165

Based on the received measurements, the IIs-CU calculates the average RSSI and occupancy ratios for different band combinations as shown below. As an example, for 4 CC, the IIs-CU average the measurements (RSSI and occupancy ratios) for the 4 channels in a single combination.

TABLE 7

| Band Combination index | 4 CCs example (if UNII-1 and 3 are only supported) | Average RSSI over 4 CCs | occupancy ratio over 4 CCs | Occupancy ratio rank (1:best) | Passed occupancy ratio threshold | Selected combination |
| --- | --- | --- | --- | --- | --- | --- |
| 1 | 36/40/44/48 | | | 2 | Yes | |
| 2 | 149/153/157/161 | | | 1 | Yes | Selected |
| 3 | 153/157/161/165 | | | 3 | | |

TABLE 8

| Band Combination index | 3 CCs example (if UNII-1 and 3 are only supported) | Average RSSI over 3 CCs | occupancy ratio over 4 CCs | Occupancy ratio rank (1:best) | Passed occupancy ratio threshold | Selected combination |
| --- | --- | --- | --- | --- | --- | --- |
| 1 | 36/40/44 | | | 5 | Yes | |
| 2 | 36/40/48 | | | 3 | Yes | Selected |
| 3 | 36/44/48 | | | 4 | Yes | |
| 4 | 40/44/48 | | | 6 | | |
| 5 | 149/153/157 | | | 11 | | |
| 6 | 149/153/161 | | | 1 | Yes | |
| 7 | 149/157/161 | | | 10 | | |
| 8 | 153/157/161 | | | 7 | | |
| 9 | 153/157/165 | | | 9 | | |
| 10 | 153/161/165 | | | 2 | Yes | |
| 11 | 157/161/165 | | | 8 | | |

The IIs-CU ranks the band combinations based on the occupancy ratios.

The IIs-CU filters the combinations based on an occupancy ratio threshold (i.e., create a set of combinations with occupancy ratios below a predefined threshold, for example 20%).

The IIs-CU selects the band combination with the minimum RSSI among the filtered set (i.e., combinations with occupancy ratio below the occupancy ratio threshold).

Algorithm 2: DFS Algorithm for multiCell (M-plane)

The RU collects measurements periodically about the supported unlicensed bands and send these measurements to the IIs-CU based on the configuration parameters in the initial handshake (e.g., DFS measurement report period).

These measurements can be trigged by a "startMeasurements" message (which includes the bands to scan, channels carrier frequencies, measurement report period) and stopped by a "stopMeasurements" message.

For every measurement report, the IIs-CU repeats algorithm 1 by calculating the average parameters over the channels of a single band combination, rank them based on the occupancy ratios, filter the set based on the predefined threshold, and select the best combination based with minimum average RSSI.

In one exemplary implementation of the algorithm, the DFS measurement report period can be adapted by the IIs-CU based on how fast frequency hopping is allowed. As an example, the IIs-CU can only allow DFS 1-4 times per day to minimize service disruption.

In another exemplary implementation of the algorithm, the IIs-CU can only switch band combinations if the difference between the average RSSI of the currently used combination and the minimum average RSSI (after DFS measurement) is larger than a predefined threshold.

In another exemplary implementation of the algorithm, the IIs-CU can only switch band combinations if the difference between the occupancy ratio of the currently used combination and the minimum occupancy ratio (after DFS measurement) is larger than a predefined threshold.

In another exemplary implementation of the algorithm, the IIs-CU can only switch band combinations if the difference between the average RSSI of the currently used combination and the minimum average RSSI (after DFS measurement) is larger than a predefined threshold or if the difference between the occupancy ratio of the currently used combination and the minimum occupancy ratio (after DFS measurement) is larger than a predefined threshold.

Algorithm 3: UEs Assignment/Allocation to licensed/unlicensed cells.

Part 1: Initial Assignment:

Divide UEs into two groups: LAA-capable UEs and Non-LAA capable UEs.

Assign non-LAA capable UEs to licensed CCs.

Assign LAA-capable UEs to licensed CCs until the licensed cell load reaches a maximum threshold (licensed CC utilization threshold: $LCU_{th}$) (e.g., $LCU_{th}$=70% utilization).

If LAA-capable UEs still remain unassigned while the maximum threshold of all licensed CCs is reached, assign LAA-capable UEs to unlicensed CCs (based on algorithm 3.1, described below).

Part 2: Real-time operation and optimization:

For every new UE, if the UE is non-LAA capable, assign it to a licensed CC (this may cause increase in the licensed CCs utilization. However, this is be solved in the periodic re-distribution of LAA-capable UEs). If the UE is a LAA-capable, assign it to an unlicensed CC (based on algorithm 3.1).

For every period $T_{alloc}$ (e.g., $T_{alloc}$=60 mins), the IIs-CU re-distribute all the LAA-capable UEs to licensed and unlicensed channels with the following objectives:

Reduce the utilization on the licensed CCs to $LCU_{th}$.

Optimally assign the LAA-capable UEs to the unlicensed CCs based on each UE reported CQI.

Balance the load on all CCs.

Periodic re-distribution of LAA capable UEs is done similar to the initial assignment.

Assign LAA-capable UEs to licensed CCs until the licensed cell load reaches a maximum threshold (licensed CC utilization threshold: $LCU_{th}$) (e.g., $LCU_{th}$=70% utilization).

If LAA-capable UEs still remain unassigned while the maximum threshold of all licensed CCs is reached, assign LAA-capable UEs to unlicensed CCs (based on algorithm 3.1).

$T_{alloc}$ should be adapted based on the deviation from $LCU_{th}$. As the licensed CCs utilization increases, $T_{alloc}$ should decrease to avoid blocking of non-LAA capable UEs to licensed CCs.

Algorithm 3.1: LAA-capable UEs assignment to unlicensed CCs after reaching $LCU_{th}$ on licensed CCs.

If the number of unlicensed CCs equal to one, assign all the LAA-capable UEs to the unlicensed CC.

If the number of unlicensed CCs is ≥1:

Build a matrix for the LAA-capable UEs utility function for different unlicensed CCs. There are four parameters affecting the UE assignment to unlicensed CCS (i.e., the utility function):

Cell load
UE channel gain (or CQI)
DFS measurements: Occupancy ratio
DFS measurements: Average RSSI The simplified utility function for user (i) operating over CC (j) can be $$u_{ij} = (1 - R_{oj}) * P_{jj} * B * \log\left(1 + \frac{P_{Tj} * |h_{ij}|^2}{N_o B + I_j}\right)$$

represented as:
Where:

$R_{oj}$ is the latest reported occupancy ratio (derived from the carrier-selection/DFS measurements) for unlicensed CC j. This takes into account the crowdedness of the channel.

$P_{sj}$ is the probability of user scheduling over channel (j). This takes into account the cell load. $P_{sj}=1/N_{uj}$, where $N_{uj}$ is the current number of UEs added to CC j.

B: channel bandwidth.

$P_{Tj}$ is the transmission power of the RU over CC j.

$h_{ij}$ is the channel gain of UE (i) over CC j assuming reciprocal CSI is known at the RU.

$N_o$ is the noise power spectral density at the UE (assume constant among all UEs if information is not available).

$I_j$ is the approximated external interference at the UE (e.g., from neighboring Wi-Fi access points, and the like). This can be derived from the latest average RSSI value reported from the RU during channel measurement (i.e., for carrier-selection/DFS). This is based on the assumption that external interference per CC is uniform among RU and UEs.

Ordinarily skilled artisans will understand that other utility functions that capture the aforementioned parameters (or any other parameters affecting the UEs performance) can be used as well to model the assignment problem.

TABLE 9

|    | CC1      | CC2      | ... | CCu      |
|----|----------|----------|-----|----------|
| U1 | $U_{11}$ | $U_{12}$ |     | $U_{1u}$ |
| U2 | $U_{21}$ | $U_{22}$ |     | $U_{2u}$ |
| ... | ...     |          |     |          |
| Um | $U_{m1}$ | $U_{m2}$ |     | $U_{mu}$ |

Solution 1: Iterative Hungarian method:

One exemplary solution is to use a modified version of the Hungarian method. The Hungarian method can be used to solve assignment problems in polynomial time $O(n^3)$.

Objective: To maximize the sum of the utility functions while maintaining equal load balance on all unlicensed CCs.

Step X: Create a sub-matrix from the original matrix with a number of UEs equal to the number of unlicensed CCs. This will be the cost matrix (with negative utilities).

Solve the assignment problem using the regular Hungarian method (now each UE of the sub-matrix will be assigned to a single unlicensed CC and each unlicensed CC will have a single UE from the sub-matrix).

Remove the rows from the original matrix corresponding to the UEs already assigned to unlicensed CCs. Call this new matrix the original matrix.

Go to Step X.

Solution 2:

Another exemplary solution that should return higher total utility but will not maintain comparable load balance among unlicensed CCs is as follows:

Step Y: Iterate over the UEs in the original matrix.

For every UE, select the unlicensed CC that return the maximum utility function.

Check if the selected CC has reached its maximum allowable load (can be pre-defined as a function of the number of UEs).

If yes, remove the CC column from the original matrix. Call this new matrix as the original matrix. Go to step Y.

If no, go to step Y.

Fronthaul Transmission Rate Adaptation

In C-RANs, the BBU 103 transmits the data packets to the RRU 105 ahead of time to compensate for the fronthaul latency. This fronthaul latency is function of several factors including the physical distance between the BBU 103 and the RRU 105, transport network, network congestion, and the like.

One problem that faces C-RANs (for both licensed and unlicensed spectrum) is to determine the amount of data packets that need to be transmitted from the BBU 103 to the RRU 105 to avoid buffer overflow and buffer underflow at the RRU. Usually, a single BBU 103 can support multiple RRUs.

Figure 26:
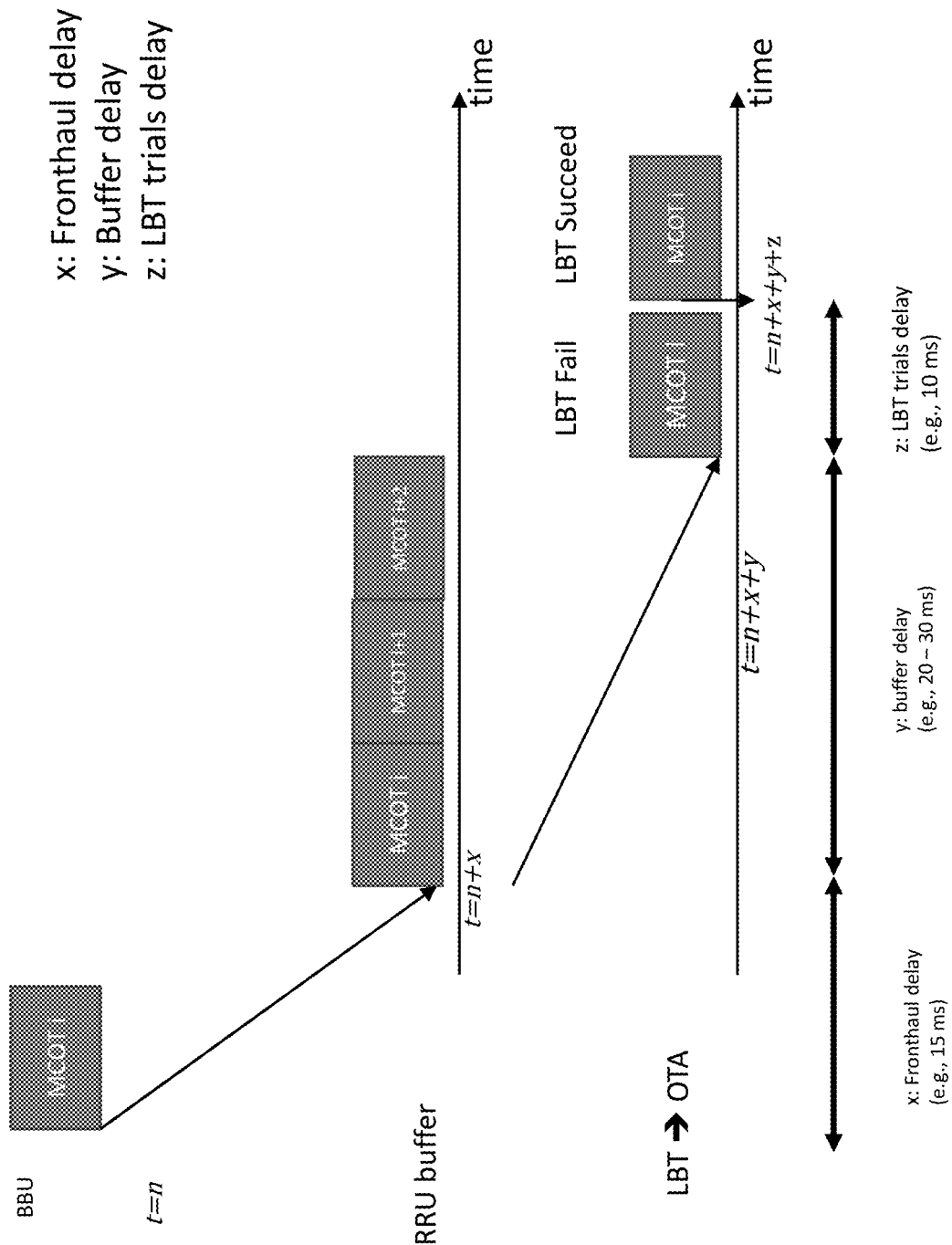
FIG. 26 is an embodiment of a configuration and method of fronthaul rate adaptation.

FIG. 26 is an embodiment of a configuration and method of fronthaul rate adaptation, described as follows.

1) After RRU 105 bootup, the BBU 103 sends multiple pilot messages to the RRU 105, each includes a timestamp for the transmission time (at the BBU 103).
2) The RRU 105 replies with a response message to each pilot message, and each reply includes the time the RRU 105 can receive the pilot message.
3) Based on the buffer size at the RRU 105 and the fronthaul latency, the BBU 103 adapts the transmission rate to the RRU 105 (this is different from the transmission rate OTA).

The first pilot/response messages exchanged between the BBU 103 and the RRU 105 capture the physical distance latency between the BBU 103 and the RRU 105, transport network latency, and other fixed parameters that introduce fixed latency.

4) To cover other dynamic changes in the fronthaul latency, the RRU 105 periodically sends the buffer status to the BBU 103.
5) The BBU 103 and the RRU 105 periodically exchange the pilot/response messages to refine the estimated fronthaul latency.
6) The BBU 103 adapts the fronthaul transmission rate based on the fronthaul latency and the RRU 105 buffer size.
7) If the fronthaul latency increases, the BBU 103 can increase the fronthaul transmission rate for a short period to compensate for that delay and then reduce it back to normal. Vice versa is true. Similarly, for the RRU 105 buffer size.
8) For LAA, a similar concept (used for varying fronthaul latency) can be applied for varying LBT delay.
    a. LBT delay is defined as the amount of time needed by the RRU 105 to sense the spectrum to transmit specific data packets.
    b. LBT delay can vary based on various metrics such as network density, traffic priority class, traffic size, and the like.
    c. Varying LBT latency plays a crucial role in determining the RRU 105 buffer size.
    d. The BBU 103 adapts the fronthaul transmission rate based on the LBT latency in a similar fashion to the fronthaul latency.

Systems and components thereof for employing embodiments of the present disclosure can comprise a central processing unit (CPU) or any other processor. The input unit can comprise a receiver, transceiver or any other means for receiving. The output unit can comprise a transmitter, transceiver or any other means for transmitting. The input unit and the output unit of the apparatus can be functionalities running on the processor of the apparatus or alternatively can be separate functional components. They can also be implemented as integral transceivers. The input unit and the output unit can be implemented e.g. as physical transmitters/receivers for transceiving via an interface, as routing entities for sending/receiving data packets in a PS (packet switched) network, or as any suitable combination thereof. Systems and components thereof can also exchange information over internal interfaces.

Each component can be configured to process various data inputs and to control the input unit and the output unit. Each component can further comprise a memory. The memory can serve to store code for carrying out the methods according to the examples of the present embodiments.

One of ordinary skill in the art will appreciate that the architecture of systems described herein are non-limiting examples that is illustrative of at least a portion of at least one embodiment. As such, more or less components can be employed and/or arranged differently without departing from the scope of the innovations described herein.

Third Generation Partnership Project (3GPP) technology standards and reports referred to herein, and the entirety of each of which are incorporated by reference hereby, include:

3GPP TR 38.801 V14.0.0 (2017-03)
3GPP TR 36.889 V13.0.0 (2015-06)
3GPP TS 36.211 V14.3.0 (2017-06)
3GPP TS 36.300 V15.1.0 (2018-04-03)
XRAN-FH.CUS.0-v01.00.02 (2018-04-04)
3GPP TS 36.213 V15.1.0 (2018-03)

The invention claimed is:

1. A method comprising:
transmitting, from a lower layer a Baseband Unit (BBU) to a layer of a Remote Radio Unit (RRU), via a fronthaul interface, a discovery reference signal (DRS) transmission; wherein a Control Unit (CU) of the BBU is configured to:
send the DRS signal at a time $DRS_{th,1}$ (DRS Threshold$_1$) or a time $DRS_{th,2}$ (DRS Threshold$_2$);
send an LBT DRS request at a target subframe for Listen Before Talk (LBT) sensing; and
determine if a discovery measurement timing configuration (DMTC) offset time has passed, and
if so, end the DRS transmission; and if not,
determine if a current time is $DRS_{th,1}$ or $DRS_{th,2}$, ($T_{now}=DRS_{th,1}$ or $T_{now}=DRS_{th,2}$?); and
if so, send the DRS transmission.

2. The method of claim 1, wherein the CU is further configured to: if the CU determines the current time is not the time $DRS_{th,1}$ or the time $DRS_{th,2}$ ($T_{now}=DRS_{th,1}$ or $T_{now}=DRS_{th,2}$?) determine if the RRU has received an LBT DRS request; and if not, determine if the DMTC offset time has passed and continue the DRS transmission; if the CU determines the RRU has received the LBT DRS request, determine if the outcome is successful, and if so, end the DRS transmission; if the CU determines the LBD DRS request was not successful, determine if the DMTC offset time has passed and continue the DRS transmission process.

3. A method comprising:
transmitting, from a lower layer a Baseband Unit (BBU) to a layer of a Remote Radio Unit (RRU), via a fronthaul interface, a discovery reference signal (DRS) transmission;
wherein a Control Unit (CU) of the BBU is configured to:
send the DRS signal at a time $DRS_{th,1}$ or a time $DRS_{th,2}$;
send an LBT DRS request at a target subframe for Listen Before Talk (LBT) sensing; and
determine if a discovery measurement timing configuration (DMTC) offset time has passed; and
wherein the RRU is configured to:
determine if the DRS is received, and if so, buffer the DRS;
if the DRS is not received, continue to listen for the DRS;
if the DRS is buffered, determine if the RRU has received an LBT DRS request from the CU; and
if so, determine if the discovery measurement time window (DMTC) offset time has passed, and if so, terminate the process.

4. The method of claim 3, wherein the RRU is configured to:
if the DMTC offset time has not passed, determine if a new DRS has been received;
if not, start an LBT spectrum sensing at a configured time;
if a new DRS has been received, drop the existing buffered DRS and buffer a new DRS; and
start the LBT spectrum sensing at the configured time.

5. The method of claim 4, wherein the RRU is configured to:
determine if the LBT spectrum sensing is successful;
if not, send an LBT DRS failure response to the CU;
determine if the DMTC offset time has passed;
if so, send an LBT DRS success response to the CU, and send the DRS over the air to the target device.

6. A system comprising:
a Baseband Unit (BBU) comprising a Control Unit (CU) configured to transmit, via a fronthaul interface, a discovery reference signal (DRS) transmission to a Remote Radio Unit (RRU), wherein a Control Unit (CU) of the BBU is configured to:
send the DRS signal at a time $DRS_{th,1}$ or a time $DRS_{th,2}$;
send an LBT DRS request at a target subframe for Listen Before Talk (LBT) sensing; and
determine if a discovery measurement timing configuration (DMTC) offset time has passed; and
if so, end the DRS transmission and if not,
determine if a current time is $DRS_{th,1}$ or $DRS_{th,2}$, ($T_{now}=DRS_{th,1}$ or $T_{now}=DRS_{th,2}$?); and if so, send the DRS transmission.

7. The system of claim 6 wherein the CU is further configured to:
if the CU determines the current time is not the time $DRS_{th,1}$ or $DRS_{th,2}$ ($T_{now}=DRS_{th,1}$ or $T_{now}=DRS_{th,2}$?), determine if the RRU has received an LBT DRS request and if so, end the DRS transmission; and if not, determine if the DMTC offset time has passed and continue the DRS transmission; if the CU determines the RRU has received the LBT DRS request, determine if the outcome is successful, and if so, end the DRS transmission; if the CU determines the LBD DRS request was not successful, determine if the DMTC offset time has passed and continue the DRS transmission process.

8. A system comprising:
a Baseband Unit (BBU) comprising a Control Unit (CU) configured to transmit, via a fronthaul interface, a discovery reference signal (DRS) transmission to a Remote Radio Unit (RRU), wherein a Control Unit (CU) of the BBU is configured to:
send the DRS signal at a time $DRS_{th,1}$ or a time $DRS_{th,2}$;
send an LBT DRS request at a target subframe for Listen Before Talk (LBT) sensing; and
determine if a discovery measurement timing configuration (DMTC) offset time has passed; and
wherein the RRU is configured to:
determine if the DRS is received, and if so, buffer the DRS;
if the DRS is not received, continue to listen for the DRS;
if the DRS is buffered, determine if the RRU has received an LBT DRS request from the CU; and
if so, determine if the discovery measurement time window (DMTC) offset time has passed, and if so, terminate the process.

9. The system of claim 8, wherein the RRU is configured to:
if the DMTC offset time has not passed, determine if a new DRS has been received;
if not, start an LBT spectrum sensing at a configured time;
if a new DRS has been received, drop the existing buffered DRS and buffer a new DRS; and
start the LBT spectrum sensing at the configured time.

10. The system of claim 9, wherein the RRU is configured to:
determine if the LBT spectrum sensing is successful;
if not, send an LBT DRS failure response to the CU;
determine if the DMTC offset time has passed;
if so, send an LBT DRS success response to the CU, and send the DRS over the air to the target device.

* * * * *